United States Patent
Wu et al.

(10) Patent No.: US 12,166,717 B2
(45) Date of Patent: Dec. 10, 2024

(54) METHOD OF SOUND REFERENCE SIGNAL TIME BUNDLING

(71) Applicant: ZTE CORPORATION, Guangdong (CN)

(72) Inventors: Hao Wu, Shenzhen (CN); Chuangxin Jiang, Shenzhen (CN); Bo Gao, Shenzhen (CN); Ke Yao, Shenzhen (CN); Yuxin Wang, Shenzhen (CN); Yu Ngok Li, Shenzhen (CN); Zhaohua Lu, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 290 days.

(21) Appl. No.: 17/853,427

(22) Filed: Jun. 29, 2022

(65) Prior Publication Data

US 2023/0067551 A1    Mar. 2, 2023

Related U.S. Application Data

(63) Continuation of application No. PCT/CN2020/100529, filed on Jul. 7, 2020.

(51) Int. Cl.
*H04W 4/00*     (2018.01)
*H04L 5/00*     (2006.01)
*H04W 72/0453*  (2023.01)
*H04W 72/23*    (2023.01)

(52) U.S. Cl.
CPC ....... *H04L 5/0051* (2013.01); *H04W 72/0453* (2013.01); *H04W 72/23* (2023.01)

(58) Field of Classification Search
None
See application file for complete search history.

(56) References Cited

U.S. PATENT DOCUMENTS

| | | | |
|---|---|---|---|
| 2013/0028138 A1 | 1/2013 | Hao et al. | |
| 2013/0077574 A1 | 3/2013 | Ekpenyong et al. | |
| 2023/0046727 A1* | 2/2023 | Jung | H04W 72/1268 |

FOREIGN PATENT DOCUMENTS

| | | |
|---|---|---|
| CN | 101690066 A | 3/2010 |
| CN | 101808409 A | 8/2010 |
| WO | WO-2013/135205 A1 | 9/2013 |
| WO | WO-2017/076162 A1 | 5/2017 |

OTHER PUBLICATIONS

Extended European Search Report on EP Appl No. 20943889.4, dated Jul. 3, 2023 (11 pages).

(Continued)

*Primary Examiner* — Zewdu A Beyen
(74) *Attorney, Agent, or Firm* — Foley & Lardner LLP

(57) ABSTRACT

Presented are systems and methods for sounding reference signal (SRS) time bundling. A wireless communication device may receive a configuration to determine a first frequency location of an aperiodic SRS from a wireless communication node. The first frequency location may be determined according to a second frequency location of at least one occasion of a non-aperiodic SRS. The wireless communication device may receive a downlink control information (DCI) transmission. The wireless communication device may transmit, responsive to the DCI transmission, the aperiodic SRS using the first frequency location.

17 Claims, 9 Drawing Sheets

(56) References Cited

OTHER PUBLICATIONS

Qualcomm Incorporated: "Dropping rule for PUSCH in UpPTS aperiodic SRS periodic SRS", 3GPP TSG-RAN WG1 Meeting #96bis, R1-1905545, Xi'an China, May 25, 2019 (3 pages).
Apple Inc., "On Further MIMO Enhancement" 3GPP TSG RAN WG1 #100b, R1-2004234, Jun. 5, 2020, e-Meeting (10 pages).
Ericsson, "High Level Views on Rel-17 feMIMO" 3GPP TSG-RAN WG1 Meeting #101-e, Tdoc R1-2004633, Jun. 5, 2020, e-meeting (15 pages).
Futurewei, "Discussion on RAN2 LS on dormant BWP configuration and related operation" 3GPP TSG RAN WG1 #100bis-e, R1-2002051, Apr. 30, 2020, e-Meeting (14 pages).
Moderator (China Telecom), "Summary#2 of uplink Tx switching" 3GPP TSG RAN WG1 #100bis, R1-2002724, Apr. 30, 2020, e-Meeting (16 pages).
Moderator (China Telecom), "Summary#3 of uplink Tx switching" 3GPP TSG RAN WG1 #100bis, R1-2002793, Apr. 30, 2020, e-Meeting (16 pages).
Qualcomm Incorporated, "Initial thoughts on Potential Positioning Enhancements" 3GPP TSG RAN WG1 #101-e, R1-2004492, Jun. 5, 2020, e-Meeting (14 pages).
Samsung, "On Rel.17 FeMIMO WI" 3GPP TSG RAN WG1 #101, R1-2003918, Jun. 5, 2020, e-Meeting (12 pages).
ZTE, "Preliminary views on further enhancement for NR MIMO" 3GPP TSG RAN WG1 Meeting #101-e, R1-2003483, Jun. 5, 2020, e-Meeting (18 pages).
International Search Report and Written Opinion for PCT Appl. No. PCT/CN2020/100529, dated Apr. 6, 2021 (9 pages).
PANASONIC: "Remaining issues on SRS enhancements in Rel.11" 3GPP TSG-RAN WG1 Meeting #70; R1-123284; Aug. 17, 2021; Qingdao, China (7 pages).

* cited by examiner

METHOD OF SOUND REFERENCE SIGNAL TIME BUNDLING

CROSS-REFERENCE TO RELATED APPLICATION

This application claims the benefit of priority under 35 U.S.C. § 120 as a continuation of PCT Patent Application No. PCT/CN2020/100529, filed on Jul. 7, 2020, the disclosure of which is incorporated herein by reference in its entirety.

TECHNICAL FIELD

The disclosure relates generally to wireless communications, including but not limited to systems and methods for sound reference signal (SRS) time bundling.

BACKGROUND

The standardization organization Third Generation Partnership Project (3GPP) is in the process of specifying a new Radio Interface called 5G New Radio (5G NR) as well as a Next Generation Packet Core Network (NG-CN or NGC). A wireless communication system (e.g., a 5G NR wireless communication system) may utilize a reference signal for uplink (UL) and/or downlink (DL) channel measurement(s). The reference signal(s) may be configured for one or more uses and/or applications.

SUMMARY

The example embodiments disclosed herein are directed to solving the issues relating to one or more of the problems presented in the prior art, as well as providing additional features that will become readily apparent by reference to the following detailed description when taken in conjunction with the accompany drawings. In accordance with various embodiments, example systems, methods, devices and computer program products are disclosed herein. It is understood, however, that these embodiments are presented by way of example and are not limiting, and it will be apparent to those of ordinary skill in the art who read the present disclosure that various modifications to the disclosed embodiments can be made while remaining within the scope of this disclosure.

At least one aspect is directed to a system, method, apparatus, or a computer-readable medium. A wireless communication device may receive a configuration to determine a first frequency location of an aperiodic sounding reference signal (SRS) from a wireless communication node. The first frequency location may be determined according to a second frequency location of at least one occasion of a non-aperiodic SRS (e.g., a periodic SRS or a semi-persistent SRS). The wireless communication device may receive a downlink control information (DCI) transmission. The wireless communication device may transmit the aperiodic SRS using the first frequency location, responsive to the DCI transmission.

In some embodiments, the wireless communication device may determine that the first frequency location is same as the second frequency location. In some embodiments, the wireless communication device may determine that a hopping pattern (e.g., frequency hopping pattern) of the aperiodic SRS is same as a hopping pattern of the at least one occasion of the non-aperiodic SRS. In some embodiments, the wireless communication device may determine that the first frequency location is a subset of the second frequency location. In some embodiments, the wireless communication device may determine that the first frequency location is same as one or more frequency hops of the at least one occasion of the non-aperiodic SRS.

In some embodiments, the wireless communication device may determine the one or more frequency hops according to at least one parameter of the configuration. In some embodiments, the at least one occasion of the non-aperiodic SRS may comprise at least one of: a most recent occasion of the non-aperiodic SRS occurring before the DCI transmission, a most recent occasion of the non-aperiodic SRS occurring before the transmission of the aperiodic SRS, a T-th occasion of the non-aperiodic SRS occurring before the DCI transmission, a T-th occasion of the non-aperiodic SRS occurring before the transmission of the aperiodic SRS, a plurality of occasions from a T-th occasion to a first occasion of the non-aperiodic SRS occurring before the DCI transmission, or a plurality of occasions from a T-th occasion to a first occasion of the non-aperiodic SRS occurring before the transmission of the aperiodic SRS.

In some embodiments, the configuration may be comprised in a configuration of a SRS resource, a SRS resource set, or a SRS trigger state. In some embodiments, the wireless communication device may determine a value of T according to at least one indication from the wireless communication node. In some embodiments, the at least one indication can include a configuration parameter of the configuration. In some embodiments, the at least one indication may correspond to at least one indication in at least one field of the DCI transmission. In some embodiments, if the aperiodic SRS is to overlap with another uplink transmission in the time domain, the aperiodic SRS transmission may be skipped (e.g., blocked, bypassed, aborted, not transmitted/initiated). In some embodiments, if the aperiodic SRS is to overlap with another uplink transmission in the time domain, the transmission of one or more symbols of the aperiodic SRS that would have overlapped with the another uplink transmission may be skipped. In some embodiments, the another uplink transmission may comprise at least one of: a physical uplink shared channel (PUSCH), a physical uplink control channel (PUCCH), the non-aperiodic SRS, a physical random access channel (PRACH), or another aperiodic SRS.

In some embodiments, the configuration may be comprised in a configuration of a SRS resource set. In some embodiments, a number of resources in a resource set of the aperiodic SRS and a number of resources in a resource set of the non-aperiodic SRS may be the same. In some embodiments, SRS resources in a resource set of the aperiodic SRS may each be associated with a respective one of SRS resources in a resource set of the non-aperiodic SRS. In some embodiments, the association may be according to an order of resource identifiers or an order of time domain locations, of the SRS resources in the resource set of the non-aperiodic SRS. In some embodiments, antenna ports in a N-th resource in the resource set of the aperiodic SRS may be same as antenna ports in a N-th resource in the resource set of the non-aperiodic SRS.

In some embodiments, a transmit power of the aperiodic SRS may be equal to a transmit power of the at least one occasion of the non-aperiodic SRS. In some embodiments, an open-loop component of a transmit power of the aperiodic SRS may be equal to an open-loop component of a transmit power of the at least one occasion of the non-aperiodic SRS. In some embodiments, the aperiodic SRS and the non-aperiodic SRS may have a common set of parameters in the configuration. The common set of parameters may be used to determine an open-loop component of a transmit power of the aperiodic SRS and an open-loop component of a transmit power of the non-aperiodic SRS. In some embodiments, the wireless communication device may determine a closed-loop component of a transmit power of the aperiodic SRS, according to a transmission power control (TPC) command from the wireless communication node. In some embodiments, a power offset indicated by the TPC command may be excluded from an accumulation of the TPC command.

At least one aspect is directed to a system, method, apparatus, or a computer-readable medium. A wireless communication node may send a configuration to determine a first frequency location of an aperiodic sounding reference signal (SRS) to a wireless communication device. The first frequency location may be determined according to a second frequency location of at least one occasion of a non-aperiodic SRS. The wireless communication node may send a downlink control information (DCI) transmission to the wireless communication device to trigger the wireless communication device to transmit the aperiodic SRS using the first frequency location.

In some embodiments, the first frequency location may be same as the second frequency location. In some embodiments, a hopping pattern of the aperiodic SRS may be same as a hopping pattern of the at least one occasion of the non-aperiodic SRS. In some embodiments, the first frequency location may be a subset of the second frequency location. In some embodiments, the first frequency location may be same as one or more frequency hops of the at least one occasion of the non-aperiodic SRS. In some embodiments, the one or more frequency hops may be determined according to at least one parameter of the configuration.

In some embodiments, the at least one occasion of the non-aperiodic SRS may comprise at least one of: a most recent occasion of the non-aperiodic SRS occurring before the DCI transmission, a most recent occasion of the non-aperiodic SRS occurring before the transmission of the aperiodic SRS, a T-th occasion of the non-aperiodic SRS occurring before the DCI transmission, a T-th occasion of the non-aperiodic SRS occurring before the transmission of the aperiodic SRS, a plurality of occasions from a T-th occasion to a first occasion of the non-aperiodic SRS occurring before the DCI transmission, or a plurality of occasions from a T-th occasion to a first occasion of the non-aperiodic SRS occurring before the transmission of the aperiodic SRS.

In some embodiments, the configuration may be comprised in a configuration of a SRS resource, a SRS resource set, or a SRS trigger state. In some embodiments, a value of T may be determined according to at least one indication from the wireless communication node. In some embodiments, the at least one indication may include a configuration parameter of the configuration. In some embodiments, the at least one indication may correspond to at least one indication in at least one field of the DCI transmission. In some embodiments, the wireless communication device may be caused to skip the transmission of the aperiodic SRS, if the aperiodic SRS is to overlap with another uplink transmission in time domain. In some embodiments, the wireless communication device may be caused to skip the transmission of one or more symbols of the aperiodic SRS that would have overlapped with the another uplink transmission, if the aperiodic SRS is to overlap with another uplink transmission in time domain.

In some embodiments, the another uplink transmission may comprise at least one of: a physical uplink shared channel (PUSCH), a physical uplink control channel (PUCCH), the non-aperiodic SRS, a physical random access channel (PRACH), or another aperiodic SRS. In some embodiments, the configuration may be comprised in a configuration of a SRS resource set. In some embodiments, a number of resources in a resource set of the aperiodic SRS and a number of resources in a resource set of the non-aperiodic SRS may be same. In some embodiments, SRS resources in a resource set of the aperiodic SRS may each be associated with a respective one of SRS resources in a resource set of the non-aperiodic SRS. In some embodiments, the association may be according to an order of resource identifiers or an order of time domain locations, of the SRS resources in the resource set of the non-aperiodic SRS. In some embodiments, antenna ports in a N-th resource in the resource set of the aperiodic SRS may be same as antenna ports in a N-th resource in the resource set of the non-aperiodic SRS.

In some embodiments, a transmit power of the aperiodic SRS may be equal to a transmit power of the at least one occasion of the non-aperiodic SRS. In some embodiments, an open-loop component of a transmit power of the aperiodic SRS may be equal to an open-loop component of a transmit power of the at least one occasion of the non-aperiodic SRS. In some embodiments, the aperiodic SRS and the non-aperiodic SRS may have a common set of parameters in the configuration. In some embodiments, the common set of parameters may determine an open-loop component of a transmit power of the aperiodic SRS and an open-loop component of a transmit power of the non-aperiodic SRS. In some embodiments, a closed-loop component of a transmit power of the aperiodic SRS may be determined according to a transmission power control (TPC) command from the wireless communication node. In some embodiments, a power offset indicated by the TPC command may be excluded from an accumulation of the TPC command.

BRIEF DESCRIPTION OF THE DRAWINGS

Various example embodiments of the present solution are described in detail below with reference to the following figures or drawings. The drawings are provided for purposes of illustration only and merely depict example embodiments of the present solution to facilitate the reader's understanding of the present solution. Therefore, the drawings should not be considered limiting of the breadth, scope, or applicability of the present solution. It should be noted that for clarity and ease of illustration, these drawings are not necessarily drawn to scale.

DETAILED DESCRIPTION

Figure 1:
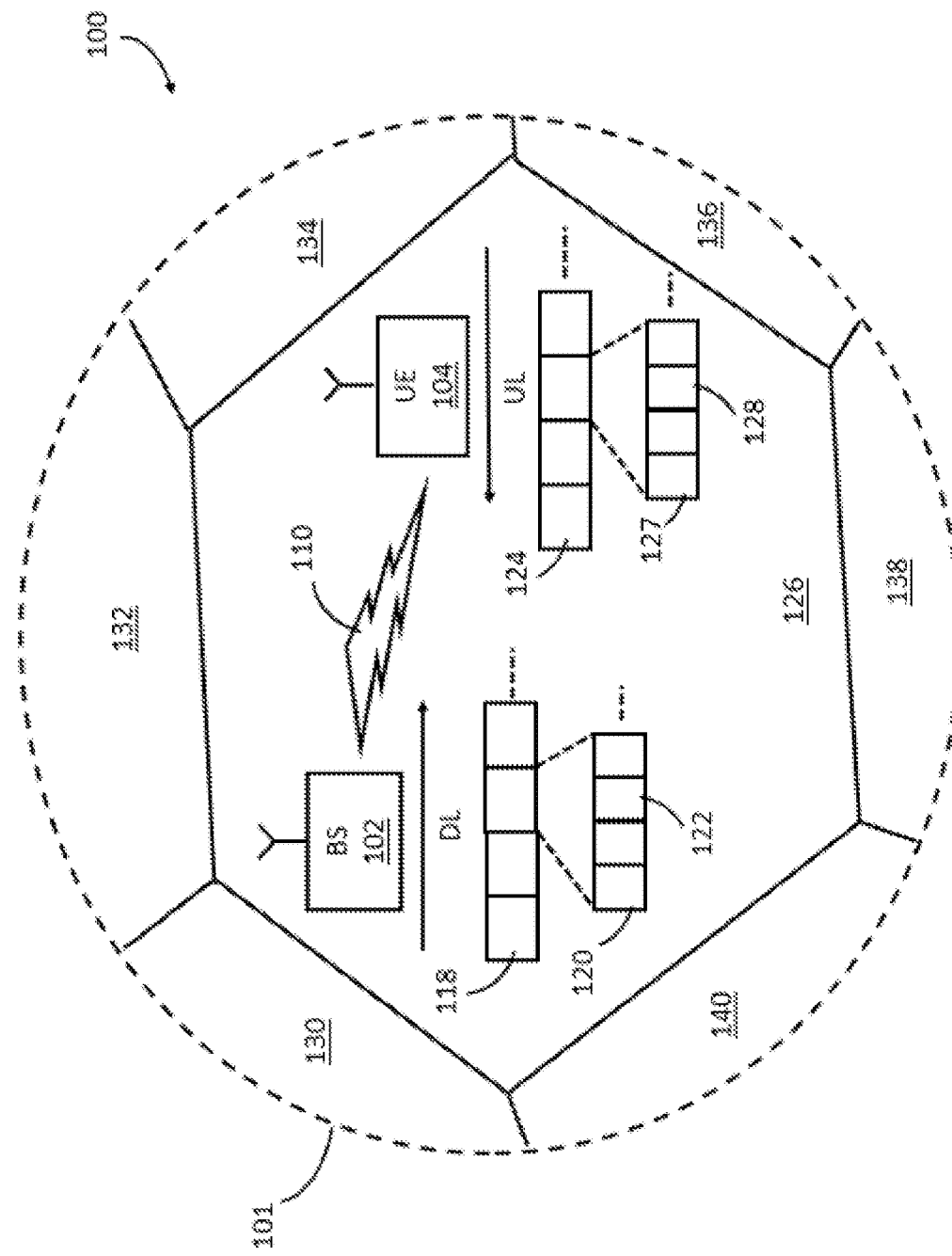
FIG. 1 illustrates an example cellular communication network in which techniques disclosed herein may be implemented, in accordance with an embodiment of the present disclosure.

Various example embodiments of the present solution are described below with reference to the accompanying figures to enable a person of ordinary skill in the art to make and use the present solution. As would be apparent to those of ordinary skill in the art, after reading the present disclosure, various changes or modifications to the examples described herein can be made without departing from the scope of the present solution. Thus, the present solution is not limited to the example embodiments and applications described and illustrated herein. Additionally, the specific order or hierarchy of steps in the methods disclosed herein are merely example approaches. Based upon design preferences, the specific order or hierarchy of steps of the disclosed methods or processes can be re-arranged while remaining within the scope of the present solution. Thus, those of ordinary skill in the art will understand that the methods and techniques disclosed herein present various steps or acts in a sample order, and the present solution is not limited to the specific order or hierarchy presented unless expressly stated otherwise.

The following acronyms are used throughout the present disclosure:

| Acronym | Full Name |
| --- | --- |
| 3GPP | 3rd Generation Partnership Project |
| 5G | 5th Generation Mobile Networks |
| 5G-AN | 5G Access Network |
| 5G gNB | Next Generation NodeB |
| 5G-GUTI 5G- | Globally Unique Temporary UE Identify |
| AF | Application Function |
| AMF | Access and Mobility Management Function |
| AN | Access Network |
| ARP | Allocation and Retention Priority |
| BS | Base station |
| CA | Carrier Aggregation |
| CM | Connected Mode |
| CMR | Channel Measurement Resource |
| CSI | Channel State Information |
| CQI | Channel Quality Indicator |
| CSI-RS | Channel State Information Reference Signal |
| CRI | CSI-RS Resource Indicator |
| CSS | Common Search Space |
| DAI | Downlink Assignment Index |
| DCI | Downlink Control Information |
| DL | Down Link or Downlink |
| DN | Data Network |
| DNN | Data Network Name |
| ETSI | European Telecommunications Standards Institute |
| FR | Frequency range |
| FDRA | Frequency-domain resource allocation |
| GBR | Guaranteed Bit Rate |
| GFBR | Guaranteed Flow Bit Rate |
| HARQ | Hybrid Automatic Repeat Request |
| MAC-CE | Medium Access Control (MAC) Control Element (CE) |
| MCS | Modulation and Coding Scheme |
| MBR | Maximum Bit Rate |
| MFBR | Maximum Flow Bit Rate |
| NAS | Non-Access Stratum |
| NF | Network Function |
| NG-RAN | Next Generation Node Radio Access Node |
| NR | Next Generation RAN |
| NZP | Non-Zero Power |
| OFDM | Orthogonal Frequency-Division Multiplexing |

-continued

| Acronym | Full Name |
| --- | --- |
| OFDMA | Orthogonal Frequency-Division Multiple Access |
| PCF | Policy Control Function |
| PDCCH | Physical Downlink Control Channel |
| PDSCH | Physical Downlink Shared Channel |
| PDU | Packet Data Unit |
| PUCCH | Physical uplink control channel |
| PUSCH | Physical uplink shared channel |
| PMI | Precoding Matrix Indicator |
| PPCH | Physical Broadcast Channel |
| PRI | PUCCH resource indicator |
| PRACH | Physical random access channel |
| QoS | Quality of Service |
| RAN | Radio Access Network |
| RAN CP | Radio Access Network Control Plane |
| RAT | Radio Access Technology |
| RB | Resource block |
| RBG | Resource Block Group |
| RRC | Radio Resource Control |
| RV | Redundant Version |
| SM NAS | Session Management Non Access Stratum |
| SMF | Session Management Function |
| SRI | SRS resource indicator |
| SRS | Sounding Reference Signal |
| SS | Synchronization Signal |
| SSB | SS/PBCH Block |
| TB | Transport Block |
| TC | Transmission Configuration |
| TCI | Transmission Configuration Indicator |
| TDRA | Time-domain resource allocation |
| TPC | Transmission power control |
| TPMI | Transmission precoding matrix indicator |
| TRP | Transmission/Reception Point |
| Tx | Transmission |
| UCI | Uplink Control Information |
| UDM | Unified Data Management |
| UDR | Unified Data Repository |
| UE | User Equipment |
| UL | Up Link or Uplink |
| UPF | User Plane Function |
| USS | UE Specific Search Space |

1. Mobile Communication Technology and Environment

FIG. 1 illustrates an example wireless communication network, and/or system, 100 in which techniques disclosed herein may be implemented, in accordance with an embodiment of the present disclosure. In the following discussion, the wireless communication network 100 may be any wireless network, such as a cellular network or a narrowband Internet of things (NB-IoT) network, and is herein referred to as "network 100." Such an example network 100 includes a base station 102 (hereinafter "BS 102"; also referred to as wireless communication node) and a user equipment device 104 (hereinafter "UE 104"; also referred to as wireless communication device) that can communicate with each other via a communication link 110 (e.g., a wireless communication channel), and a cluster of cells 126, 130, 132, 134, 136, 138 and 140 overlaying a geographical area 101. In FIG. 1, the BS 102 and UE 104 are contained within a respective geographic boundary of cell 126. Each of the other cells 130, 132, 134, 136, 138 and 140 may include at least one base station operating at its allocated bandwidth to provide adequate radio coverage to its intended users.

For example, the BS 102 may operate at an allocated channel transmission bandwidth to provide adequate coverage to the UE 104. The BS 102 and the UE 104 may communicate via a downlink radio frame 118, and an uplink radio frame 124 respectively. Each radio frame 118/124 may be further divided into sub-frames 120/127 which may include data symbols 122/128. In the present disclosure, the BS 102 and UE 104 are described herein as non-limiting examples of "communication nodes," generally, which can practice the methods disclosed herein. Such communication nodes may be capable of wireless and/or wired communications, in accordance with various embodiments of the present solution.

Figure 2:
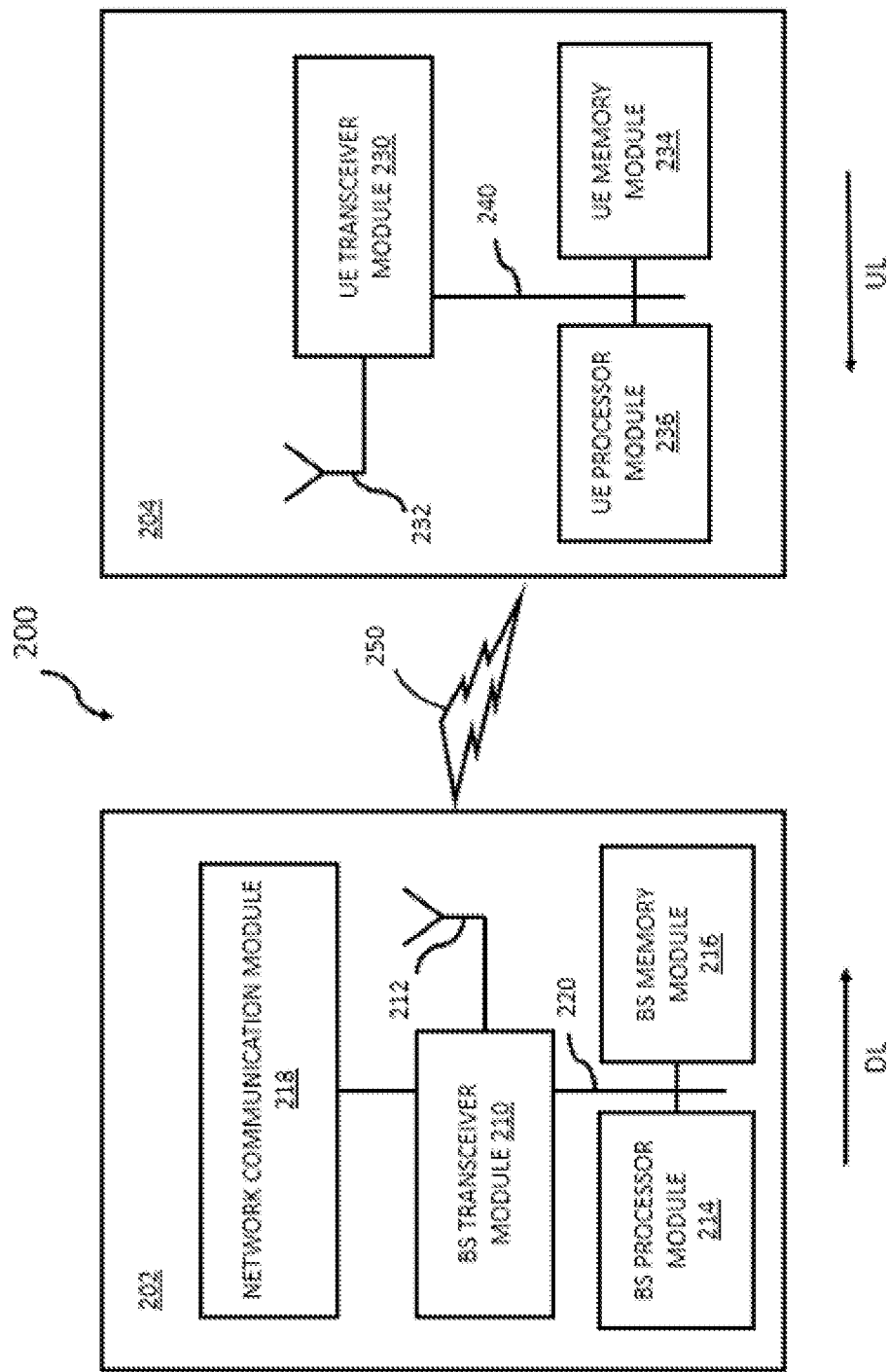
FIG. 2 illustrates a block diagram of an example base station and a user equipment device, in accordance with some embodiments of the present disclosure.

FIG. 2 illustrates a block diagram of an example wireless communication system 200 for transmitting and receiving wireless communication signals (e.g., OFDM/OFDMA signals) in accordance with some embodiments of the present solution. The system 200 may include components and elements configured to support known or conventional operating features that need not be described in detail herein. In one illustrative embodiment, system 200 can be used to communicate (e.g., transmit and receive) data symbols in a wireless communication environment such as the wireless communication environment 100 of FIG. 1, as described above.

System 200 generally includes a base station 202 (hereinafter "BS 202") and a user equipment device 204 (hereinafter "UE 204"). The BS 202 includes a BS (base station) transceiver module 210, a BS antenna 212, a BS processor module 214, a BS memory module 216, and a network communication module 218, each module being coupled and interconnected with one another as necessary via a data communication bus 220. The UE 204 includes a UE (user equipment) transceiver module 230, a UE antenna 232, a UE memory module 234, and a UE processor module 236, each module being coupled and interconnected with one another as necessary via a data communication bus 240. The BS 202 communicates with the UE 204 via a communication channel 250, which can be any wireless channel or other medium suitable for transmission of data as described herein.

As would be understood by persons of ordinary skill in the art, system 200 may further include any number of modules other than the modules shown in FIG. 2. Those skilled in the art will understand that the various illustrative blocks, modules, circuits, and processing logic described in connection with the embodiments disclosed herein may be implemented in hardware, computer-readable software, firmware, or any practical combination thereof. To clearly illustrate this interchangeability and compatibility of hardware, firmware, and software, various illustrative components, blocks, modules, circuits, and steps are described generally in terms of their functionality. Whether such functionality is implemented as hardware, firmware, or software can depend upon the particular application and design constraints imposed on the overall system. Those familiar with the concepts described herein may implement such functionality in a suitable manner for each particular application, but such implementation decisions should not be interpreted as limiting the scope of the present disclosure In accordance with some embodiments, the UE transceiver 230 may be referred to herein as an "uplink" transceiver 230 that includes a radio frequency (RF) transmitter and a RF receiver each comprising circuitry that is coupled to the antenna 232. A duplex switch (not shown) may alternatively couple the uplink transmitter or receiver to the uplink antenna in time duplex fashion. Similarly, in accordance with some embodiments, the BS transceiver 210 may be referred to herein as a "downlink" transceiver 210 that includes a RF transmitter and a RF receiver each comprising circuitry that is coupled to the antenna 212. A downlink duplex switch may alternatively couple the downlink transmitter or receiver to the downlink antenna 212 in time duplex fashion. The operations of the two transceiver modules 210 and 230 may be coordinated in time such that the uplink receiver circuitry is coupled to the uplink antenna 232 for reception of transmissions over the wireless transmission link 250 at the same time that the downlink transmitter is coupled to the downlink antenna 212. Conversely, the operations of the two transceivers 210 and 230 may be coordinated in time such that the downlink receiver is coupled to the downlink antenna 212 for reception of transmissions over the wireless transmission link 250 at the same time that the uplink transmitter is coupled to the uplink antenna 232. In some embodiments, there is close time synchronization with a minimal guard time between changes in duplex direction.

The UE transceiver 230 and the base station transceiver 210 are configured to communicate via the wireless data communication link 250, and cooperate with a suitably configured RF antenna arrangement 212/232 that can support a particular wireless communication protocol and modulation scheme. In some illustrative embodiments, the UE transceiver 210 and the base station transceiver 210 are configured to support industry standards such as the Long Term Evolution (LTE) and emerging 5G standards, and the like. It is understood, however, that the present disclosure is not necessarily limited in application to a particular standard and associated protocols. Rather, the UE transceiver 230 and the base station transceiver 210 may be configured to support alternate, or additional, wireless data communication protocols, including future standards or variations thereof.

In accordance with various embodiments, the BS 202 may be an evolved node B (eNB), a serving eNB, a target eNB, a femto station, or a pico station, for example. In some embodiments, the UE 204 may be embodied in various types of user devices such as a mobile phone, a smart phone, a personal digital assistant (PDA), tablet, laptop computer, wearable computing device, etc. The processor modules 214 and 236 may be implemented, or realized, with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. In this manner, a processor may be realized as a microprocessor, a controller, a microcontroller, a state machine, or the like. A processor may also be implemented as a combination of computing devices, e.g., a combination of a digital signal processor and a microprocessor, a plurality of microprocessors, one or more microprocessors in conjunction with a digital signal processor core, or any other such configuration.

Furthermore, the steps of a method or algorithm described in connection with the embodiments disclosed herein may be embodied directly in hardware, in firmware, in a software module executed by processor modules 214 and 236, respectively, or in any practical combination thereof. The memory modules 216 and 234 may be realized as RAM memory, flash memory, ROM memory, EPROM memory, EEPROM memory, registers, a hard disk, a removable disk, a CD-ROM, or any other form of storage medium known in the art. In this regard, memory modules 216 and 234 may be coupled to the processor modules 210 and 230, respectively, such that the processors modules 210 and 230 can read information from, and write information to, memory modules 216 and 234, respectively. The memory modules 216 and 234 may also be integrated into their respective processor modules 210 and 230. In some embodiments, the memory modules 216 and 234 may each include a cache memory for storing temporary variables or other intermediate information during execution of instructions to be executed by processor modules 210 and 230, respectively. Memory modules 216 and 234 may also each include non-volatile memory for storing instructions to be executed by the processor modules 210 and 230, respectively.

The network communication module 218 generally represents the hardware, software, firmware, processing logic, and/or other components of the base station 202 that enable bi-directional communication between base station transceiver 210 and other network components and communication nodes configured to communication with the base station 202. For example, network communication module 218 may be configured to support internet or WiMAX traffic. In a typical deployment, without limitation, network communication module 218 provides an 802.3 Ethernet interface such that base station transceiver 210 can communicate with a conventional Ethernet based computer network. In this manner, the network communication module 218 may include a physical interface for connection to the computer network (e.g., Mobile Switching Center (MSC)). The terms "configured for," "configured to" and conjugations thereof, as used herein with respect to a specified operation or function, refer to a device, component, circuit, structure, machine, signal, etc., that is physically constructed, programmed, formatted and/or arranged to perform the specified operation or function.

The Open Systems Interconnection (OSI) Model (referred to herein as, "open system interconnection model") is a conceptual and logical layout that defines network communication used by systems (e.g., wireless communication device, wireless communication node) open to interconnection and communication with other systems. The model is broken into seven subcomponents, or layers, each of which represents a conceptual collection of services provided to the layers above and below it. The OSI Model also defines a logical network and effectively describes computer packet transfer by using different layer protocols. The OSI Model may also be referred to as the seven-layer OSI Model or the seven-layer model. In some embodiments, a first layer may be a physical layer. In some embodiments, a second layer may be a Medium Access Control (MAC) layer. In some embodiments, a third layer may be a Radio Link Control (RLC) layer. In some embodiments, a fourth layer may be a Packet Data Convergence Protocol (PDCP) layer. In some embodiments, a fifth layer may be a Radio Resource Control (RRC) layer. In some embodiments, a sixth layer may be a Non Access Stratum (NAS) layer or an Internet Protocol (IP) layer, and the seventh layer being the other layer.

2. Systems and Methods for Sound Reference Signal Time Bundling

In a wireless communication system, a reference signal (e.g., a sounding reference signal (SRS) and/or other signals) may be utilized for uplink (UL) and/or downlink (DL) channel measurement. The wireless communication node and/or device may use the SRS and/or other reference signals in various processes, such as DL channel state information (CSI) acquisition, codebook based UL, non-codebook based UL, and/or beam management. The wireless communication node may configure the SRS according to one or more time domain types, such as a periodic SRS, a semi-persistent SRS, an aperiodic SRS, and/or other types. The time domain type may be configured and/or determined for a SRS resource set, the SRS resource set comprising one or more SRS resources. The SRS resource(s) may comprise one or more frequency-domain and/or time domain resources allocated for the SRS (e.g., a location in the time domain, a location in the frequency-domain, and/or other resources).

The wireless communication node may measure, determine and/or appraise the SRS resources separately. If instant/dynamic interference (e.g., interference occurring or changing over a short period of time) and/or channel variation (e.g., blocking) occurs, the separate measurement of the SRS resources may cause and/or trigger inadequate SRS measurement performance (e.g., poor and/or inadequate channel estimation performance). For example, if the interference and/or channel variation is frequency selective, one or more frequency locations of the SRS resource(s) may be unequally affected. The systems and methods presented herein include a novel approach to address the loss of SRS measurement performance in response to and/or in the presence of an instant/dynamic interference and/or channel variation event. The systems and methods presented herein may efficiently utilize additional SRS overhead to improve the SRS measurement performance by at least 30% (e.g., 40, 50 or other percent).

In 5G-NR wireless communication systems, the wireless communication node may configure one or more SRS resource sets for various usages. The various usages may comprise antenna switching (e.g., DL CSI acquisition), codebook based UL, non-codebook based UL, beam management, and/or other usages. The wireless communication node may configure the SRS resource set for one or more usages and/or applications. The SRS resource set may be configured according to a time domain type (e.g., periodic, aperiodic, non-aperiodic, semi-persistent, and/or other types). For a periodic or semi-persistent SRS resource set, the SRS of the SRS resource(s) in this set may be transmitted and/or sent periodically using pre-determined slots. A semi-persistent SRS transmission may be initiated and/or terminated via MAC CE signaling. For an aperiodic SRS resource set, a DCI and/or other indicator (or signaling) may indicate, trigger, specify and/or cause the transmission of the SRS resources in the SRS resource set. The frequency location (e.g., an occupied resource block (RB), an occupied RB set, an occupied subband, and/or other locations) of the SRS resource(s) may be predetermined (e.g., configured using RRC signaling and/or other signaling).

Frequency hopping may be used to enhance and/or increase the coverage of the SRS. If frequency hopping is used and/or enabled, a wireless communication device (e.g., a UE, a terminal, or a served node) may send and/or transmit the SRS in one or more time locations (e.g., a slot, a symbol, a symbol set, and/or other time locations) using one or more frequency locations. The frequency location(s) may comprise a subset of the full bandwidth occupied/used by the SRS resource, a range of frequencies, and/or other frequency locations.

The SRS measurement performance may degrade and/or deteriorate in the presence of an instant/instantaneous/dynamic interference and/or channel variation (e.g., channel blocking). If the instant/instantaneous/dynamic interference(s) and/or channel variation(s) is frequency selective/specific, the frequency location(s) of the SRS resource(s) may be unequally affected. The systems and methods presented herein include a novel set of schemes to address SRS measurement performance loss in the presence of an instant/instantaneous/dynamic interference(s) and/or channel variation(s). The systems and methods may result in at least a 30% (e.g., 40, 50 or other percent) increase in efficient utilization of additional SRS overhead.

A. SRS Time Bundling Techniques to Enhance SRS Measurement Performance

In this scheme, SRS time bundling may be utilized to enhance and/or improve SRS measurement performance in the presence of an instant/dynamic interference and/or channel variation. Two or more SRS resources may be bundled, coupled, and/or associated in the time domain to improve and/or enhance SRS measurement performance. The SRS measurement performance may be improved and/or enhanced via joint configuring and/or processing of the two or more SRS resources. A wireless communication node (e.g., a ground terminal, a base station, a gNB, an eNB, or a serving node) may configure at least two SRS resources that are bundled with each other. The wireless communication node(s) may configure and/or determine the SRS resource(s) at the resource level and/or at the resource set level. For example, the wireless communication node(s) may configure one SRS resource bundled with another SRS resource using RRC signaling. In another example, the wireless communication node(s) may configure one SRS resource set bundled with another SRS resource set using RRC signaling. If two or more SRS resources and/or SRS resource sets are bundled, coupled, and/or associated in the time domain, the bundled resources and/or sets may share a same or similar configuration.

In some embodiments, the bundled SRS resources may comprise at least a non-aperiodic SRS resource (e.g., a periodic SRS resource, a semi-persistent SRS resource, and/or other non-aperiodic SRS resources) and/or an aperiodic SRS resource. A DCI signaling/transmission and/or other messages may trigger and/or prompt the aperiodic SRS resource. The wireless communication node may generate, configure, transmit, and/or create the DCI and/or other messages. The wireless communication device may determine the frequency location of the aperiodic SRS resource based on the frequency location of the bundled non-aperiodic SRS resource. The embodiments in the remaining portion of the disclosure describe and/or utilize a periodic SRS as a non-limiting example, but other types of non-aperiodic SRS (e.g., a semi-persistent SRS) may be used.

Figure 3:
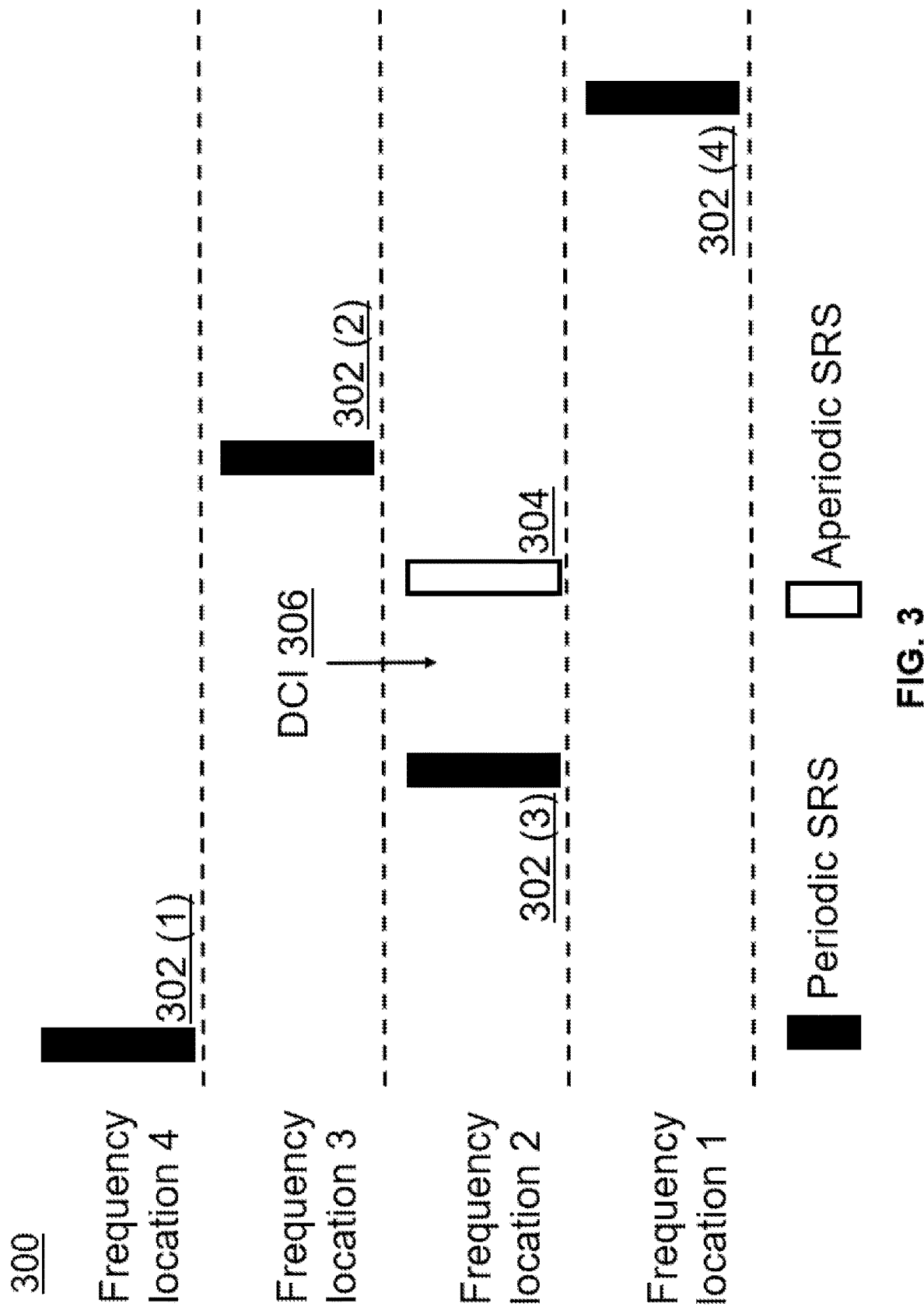
FIGS. 3-7 illustrate various approaches for improving SRS measurement performance using time bundling, in accordance with some embodiments of the present disclosure.

Referring now to FIG. 3 depicted is a representation 300 of an example approach for improving SRS measurement performance when inter-slot frequency hopping is used and/or enabled. Inter-slot frequency hopping may comprise a hop and/or jump from a first frequency range/value to a second frequency range/value across time slots. An instantaneous/dynamic interference and/or channel variation may affect at least one occasion of a non-aperiodic SRS 302(3) (e.g., a periodic SRS or a semi-persistent SRS) on a frequency location (e.g., a second frequency location, frequency location 2 and/or other frequency locations). The instantaneous/dynamic interference and/or channel variation may occur on the same frequency location as the frequency location of a most recent transmission of a non-aperiodic SRS occasion 302 and/or other frequency locations. The frequency location may comprise a frequency value and/or a range of frequencies. An occasion of the non-aperiodic SRS 302 may comprise (or refer to) one or more SRS 302 using specific frequency location(s) and/or time slot(s).

The SRS measurement performance of the wireless communication node may deteriorate and/or degrade in the presence of the instantaneous/dynamic interference and/or channel variation. In response to the instantaneous/dynamic interference and/or channel variation, the wireless communication node may send and/or transmit a DCI and/or other information. The wireless communication node may cause and/or trigger the transmission of an aperiodic SRS 304 on a frequency location of a resource (e.g., a first frequency location, frequency location 2, and/or other frequency locations) by sending/transmitting the DCI 306 and/or other information. For example, the wireless communication node may transmit the DCI 306 to the wireless communication device, triggering and/or causing the wireless communication device to transmit the aperiodic SRS 304 (e.g., at a certain time relative to the DCI). The wireless communication node may measure, process and/or analyze the aperiodic SRS 304 and the non-aperiodic SRS occasion 302(3) in conjunction. The joint processing of the aperiodic SRS 304 and the non-aperiodic SRS occasion 302(3) may increase/improve the SRS measurement performance by utilizing resources (e.g., power, bandwidth, and/or other resources) more efficiently.

The aperiodic SRS 304 and the non-aperiodic SRS occasion 302(2) may share the same and/or a similar configuration. The aperiodic SRS 304 and the non-aperiodic SRS occasion 302(3) may use the same frequency location of the resource (e.g., frequency location 2 and/or other frequency locations). The frequency location of the resource of the aperiodic SRS 304 may include or correspond to the frequency location of the instantaneous/dynamic interference and/or the channel variation. The wireless communication device may transmit one or more occasions of a non-aperiodic SRS 302 on one or more frequency locations (e.g., frequency location 1-4 and/or other frequency locations) following the aperiodic SRS 304 transmission.

The wireless communication node may configure an aperiodic SRS resource set 304 without specifying (e.g., precisely identifying/stating) the frequency location. For example, the configuration parameters of the aperiodic SRS resources in the resource set may include the number of resource blocks (RBs) used and/or occupied by the SRS resources, but may fail to disclose the specific location(s) of the RBs. The RBs used for the transmission of the aperiodic SRS resources may be determined and/or configured according to the most recent occasion of the non-aperiodic SRS resources. For example, the RBs used in the transmission of the aperiodic SRS resources may include or correspond to the RBs used in the transmission of the most recent occasion of the non-aperiodic SRS resources (e.g., before the DCI transmission that may trigger the transmission of the aperiodic SRS resource set). The most recent occasion of the non-aperiodic SRS resources may occur prior to the DCI (or other triggering message/information) transmission. The most recent occasion of the non-aperiodic SRS resources (e.g., prior to the DCI transmission that may cause the transmission of the aperiodic SRS) may be referred to as the associated non-aperiodic SRS occasion 302 of the aperiodic SRS 304.

Figure 4:
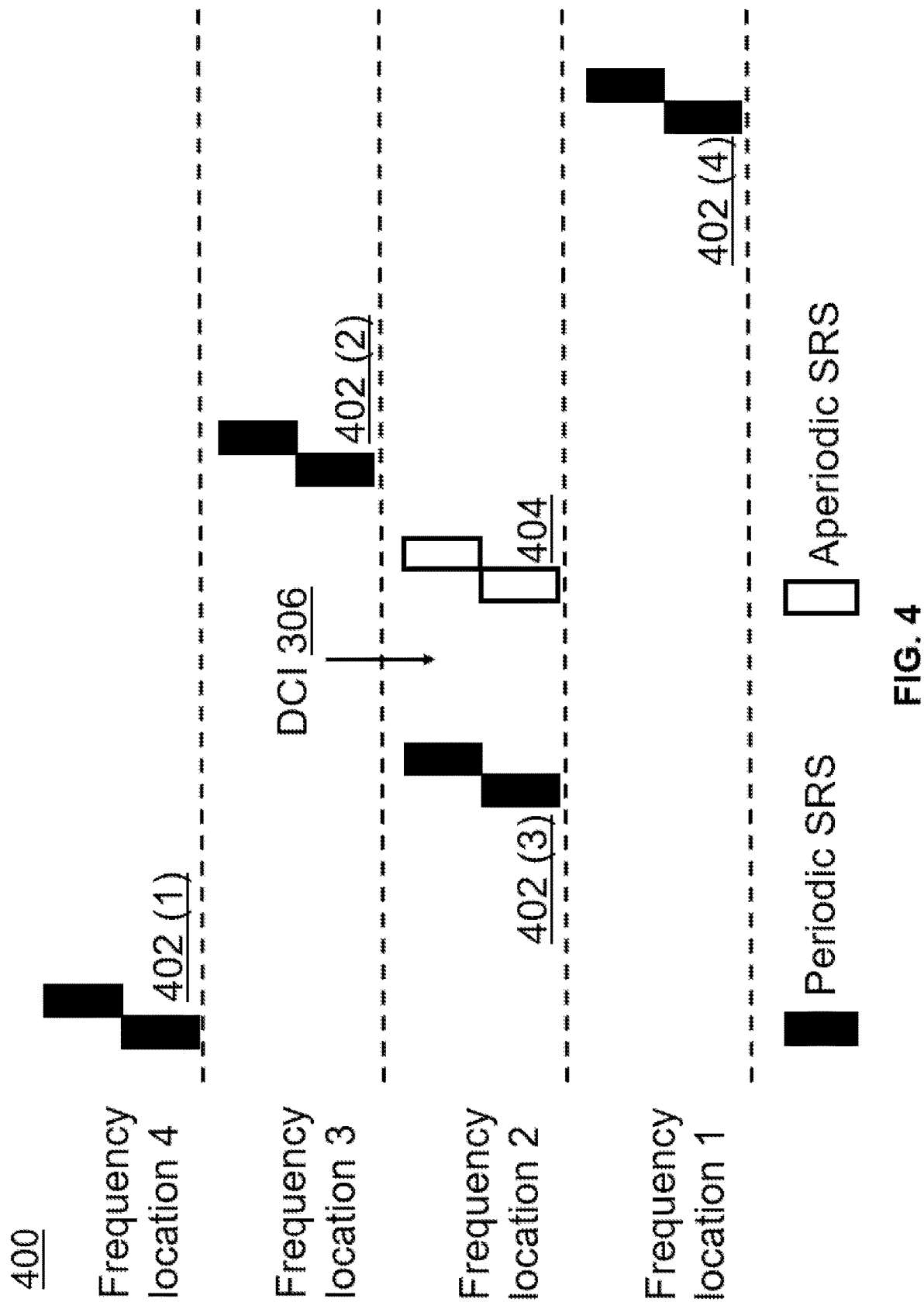

Referring now to FIG. 4 depicted is a representation 400 of an example approach for improving SRS measurement performance when inter-slot and/or intra-slot frequency hopping is enabled. In some embodiments, intra-slot frequency hopping may be enabled and/or used for the SRS transmissions. Frequency hopping may comprise a hop and/or jump from a first frequency range/value to a second frequency range/value. Intra-slot frequency hopping may comprise a hop and/or jump from a first frequency range/value to a second frequency range/value within a time slot. For example, the non-aperiodic SRS 402 may comprise one or more hops in/within a frequency location (range) within a time slot. If intra-slot frequency hopping is enabled, the frequency location (e.g., frequency location 1-4, a range of frequencies, and/or other locations) and/or the RBs (location and/or number of RBs) of the bundled SRS resources may be determined and/or configured based on at least one of the approaches of FIGS. 4-6.

The number of RBs used for the bundled aperiodic SRS 404 resource transmission may include or correspond to the number of RBs used for the transmission of the associated non-aperiodic SRS occasion 402(3) of the aperiodic SRS 404. The frequency location of the bundled aperiodic SRS 404 resource transmission may include or correspond to the frequency location of the associated non-aperiodic SRS occasion 402(3) of the aperiodic SRS 404 transmission. For example, the wireless communication device may transmit the bundled aperiodic SRS 404 resource using frequency location 2 (or other frequency locations), which is the same frequency location of the associated non-aperiodic SRS occasion 402(3). In some embodiments, the frequency location of the aperiodic SRS 404 may be a subset (e.g., portion, part) of the frequency location of the associated non-aperiodic SRS occasion 402(3).

The hopping pattern of the aperiodic SRS 404 may include or correspond to the number of RBs used for the transmission of the associated non-aperiodic SRS occasion 402(3). In some embodiments, the hopping pattern of the aperiodic SRS 404 may include or correspond to the hopping pattern of at least one occasion of the non-aperiodic SRS 402. For example, the hopping pattern of the aperiodic SRS 404 may include or correspond to the hopping pattern of the associated non-aperiodic SRS occasion 402(3). In some embodiments, the hopping pattern, the frequency location, and/or other parameters of the aperiodic SRS 404 may be determined based on the configuration of the aperiodic SRS 404 and/or via a higher-level configuration. For example, the hopping pattern may be determined based on the configuration of the number of RBs used for the transmission of the aperiodic SRS 404.

The configuration of the associated non-aperiodic SRS occasion 402(3) may indicate and/or specify the configuration of the aperiodic SRS 404. For example, the configuration of the aperiodic SRS 404 (e.g., a configuration to determine a frequency location and/or other aspects of SRS 404) may include or correspond to the configuration of the associated non-aperiodic SRS occasion 402(3). The configuration may comprise a configuration of a SRS resource, a SRS resource set, and/or a SRS trigger state. In some embodiments, one or more parameters of the configuration may indicate/specify one or more frequency hops of the associated non-aperiodic SRS occasion 402(3).

Figure 5:
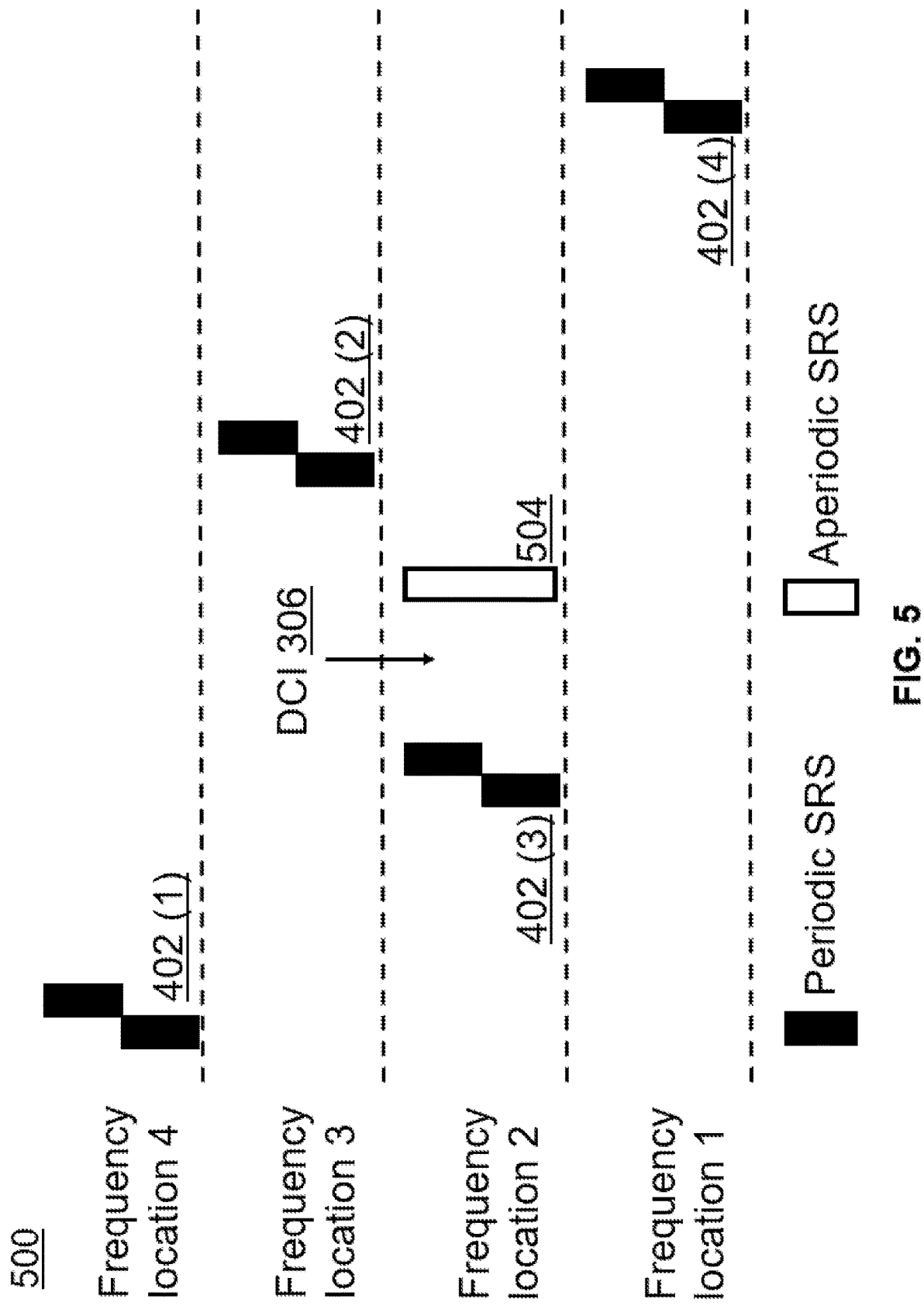

Referring now to FIG. 5 depicted is a representation 500 of an example approach for improving SRS measurement performance when inter-slot and/or intra-slot frequency hopping is enabled. If frequency hopping is enabled, the number of RBs used for transmitting and/or sending the aperiodic SRS may include or correspond to the number of RBs used for transmitting the at least one occasion of the non-aperiodic SRS. For example, the number of RBs used for transmitting and/or sending the aperiodic SRS 504 may include or correspond to the number of RBs used for transmitting and/or sending the associated non-aperiodic SRS occasion 402(3) of the aperiodic SRS 504.

In some embodiments, the aperiodic SRS 404 and/or a higher-level configuration may determine, indicate, and/or specify the hopping pattern, the frequency location, and/or other parameters of the aperiodic SRS 404. In other embodiments, the configuration of the associated non-aperiodic SRS occasion 402(3) may determine, indicate, and/or specify the hopping pattern, the frequency location, and/or other parameters of the aperiodic SRS 404. The configuration of the aperiodic SRS 504 (e.g., a configuration to determine a frequency location) may be a separate configuration than the configuration of the associated non-aperiodic SRS occasion 402(3). For example, the hopping pattern of the aperiodic SRS 504 may be unlike the hopping pattern of the at least one occasion of the non-aperiodic SRS 402.

The hopping pattern of the aperiodic SRS 504 and/or the non-aperiodic SRS 402 may include a hop/jump toward a higher frequency range or toward a lower frequency range. In other embodiments, the wireless communication device may send and/or transmit the aperiodic SRS 504 without enabling and/or using frequency hopping. For example, the wireless communication device may transmit the aperiodic SRS 504 without using the hopping pattern of the associated non-aperiodic SRS 403(3) or other hopping patterns. The frequency location of the aperiodic SRS 504 may include or correspond to the frequency location of the associated non-aperiodic SRS occasion 402(3).

Figure 6:
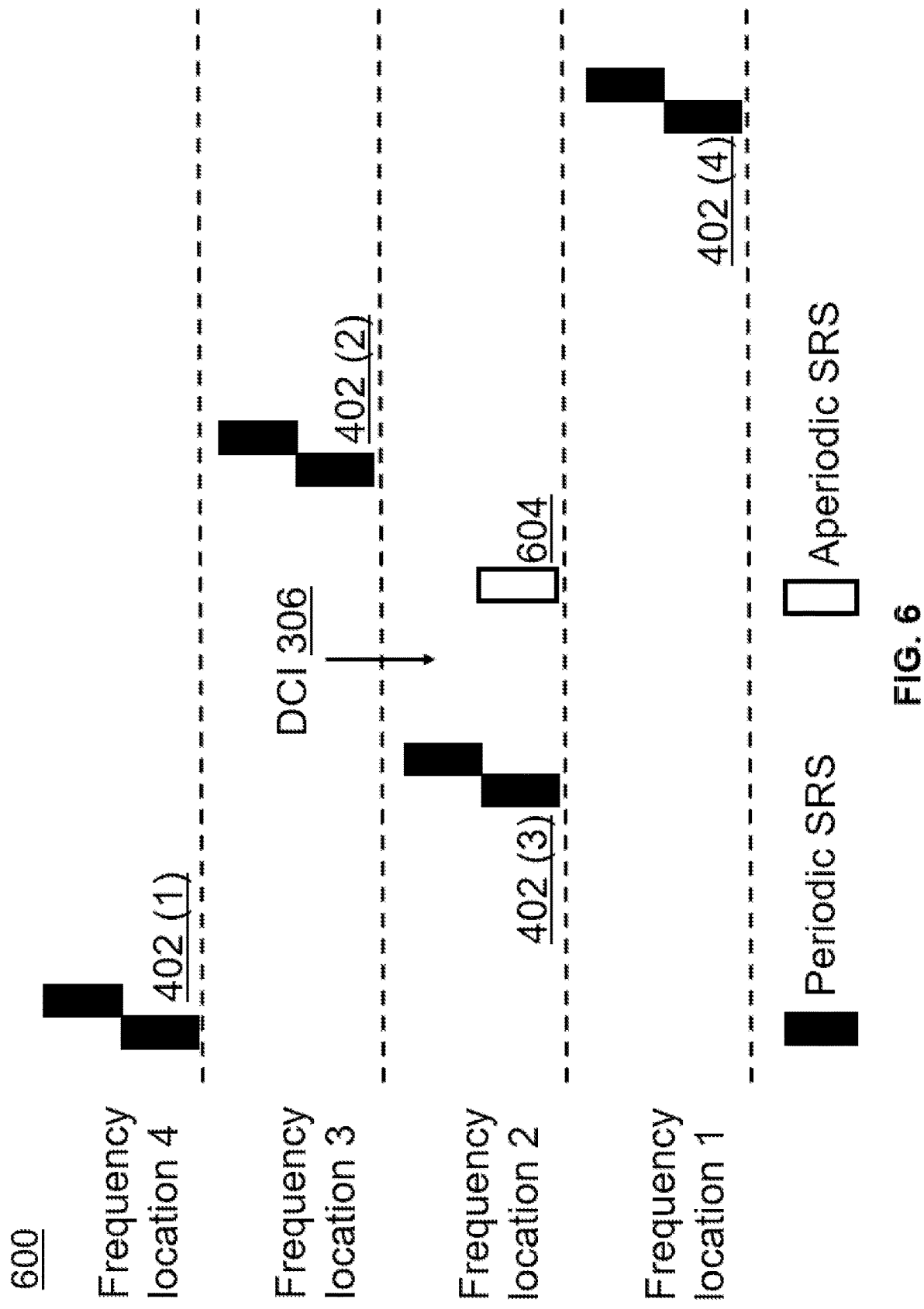

Referring now to FIG. 6 depicted is a representation 600 of an example approach for improving SRS measurement performance when inter-slot and/or intra-slot frequency hopping is enabled. If frequency hopping is enabled, the number of RBs used for transmitting/sending the aperiodic SRS 604 may include or correspond to the number of RBs used for the transmission of one hop of at least one occasion of the non-aperiodic SRS 402. For example, the number of RBs used for transmitting the aperiodic SRS 604 may include or correspond to the number of RBs used for transmitting one hop/jump of the associated non-aperiodic SRS occasion 402(3) of the aperiodic SRS 604. The one hop/jump of the associated non-aperiodic SRS 402(3) may include or correspond to any one of the hops/jumps of the associated non-aperiodic SRS 402(3).

The wireless communication device may transmit the aperiodic SRS 604 using information provided by the one or more hops/jumps of the non-aperiodic SRS 402. One or more occasions of the non-aperiodic SRS 402 may comprise one or more hops/jumps. For example, the associated non-aperiodic SRS occasion 402(3) may comprise one or more hops from a first frequency range to a second frequency range. A hop index may specify and/or indicate the (frequency) hops/jumps (or frequency locations) of non-aperiodic SRSes. The wireless communication node may determine and/or configure the hop index. For example, the wireless communication node may configure or specify the hop index for use in configuring the aperiodic SRS 604 transmission. The frequency location of the aperiodic SRS 604 may include or correspond to the frequency location (or hop index) of the one hop/jump of the associated non-aperiodic SRS 402(3). For example, according to the specified hop index, the aperiodic SRS 604 may utilize frequency location 2 (or other frequency locations), which is the same frequency location of the one hop of the associated non-aperiodic SRS 402(3).

The non-aperiodic SRS resources and/or the bundled aperiodic SRS resources may be configured in a same resource set. The resource set may comprise one or more non-aperiodic and/or aperiodic SRS resources. The aperiodic SRS resources may be mapped and/or bundled to the non-aperiodic SRS resources based on and/or using the configuration of the wireless communication node. The configuration parameters of the aperiodic SRS resources may include and/or comprise the number of RBs occupied by the aperiodic SRS resources. The configuration parameters of the aperiodic SRS resources may exclude the specific location of the RBs. If the SRS resource indicator (SRI) is indicated and/or specified for a physical uplink shared channel (PUSCH), the one or more resources indicated by the SRI may exclude the aperiodic SRS resources. The number of non-aperiodic SRS resources in the resource set may determine and/or influence the bit width of the SRI.

In some embodiments, the frequency location of the most recent non-aperiodic SRS occasion (e.g., prior to the intended/determined transmission time of the aperiodic SRS, which may be determined/specified relative to the time of the triggering DCI transmission for instance) may indicate and/or specify the frequency location of the bundled aperiodic SRS resources. The wireless communication node can improve and/or enhance the SRS measurement performance by using the bundled and/or associated SRS resources.

In other embodiments, the associated PUSCH may indicate and/or specify the frequency location of the aperiodic SRS resource. For example, the frequency location (e.g., the occupied RBs) of an aperiodic SRS resource may include or correspond to the frequency location of the PUSCH. The PUSCH may be scheduled in response to the DCI (or other triggering information or message) transmission. The DCI transmission/signaling may trigger and/or cause the wireless communication device to transmit the aperiodic SRS. Therefore, the aperiodic SRS may provide improved fine channel tracking for UL reception.

B. SRS Time Bundling Techniques to Enhance the Triggering of the Aperiodic SRS

In some embodiments, enhancing and/or improving the triggering of the aperiodic SRS may support the bundling between non-aperiodic SRS resources and aperiodic SRS resources. The wireless communication node may determine the aperiodic SRS resources and the non-aperiodic SRS resources are bundled based on the configuration of the network (e.g., NW). The wireless communication node(s) may configure and/or determine the bundling configuration at the resource level and/or at the resource set level. The configuration may comprise the configuration of the bundled aperiodic SRS resource, the SRS resource set, and/or the SRS trigger state. The network/NW may configure a parameter of the configuration to indicate and/or specify one or more (frequency) hop indexes associated with the periodic SRS. The wireless communication device may send, schedule and/or transmit the aperiodic SRS on the same frequency location of the non-aperiodic SRS using the one or more hop indexes. Therefore, the wireless communication device may transmit the aperiodic SRS on a frequency location that is affected by instantaneous/dynamic interference and/or channel variation.

C. SRS Time Bundling that Incorporates Wireless Communication Node Flexibility

Figure 7:
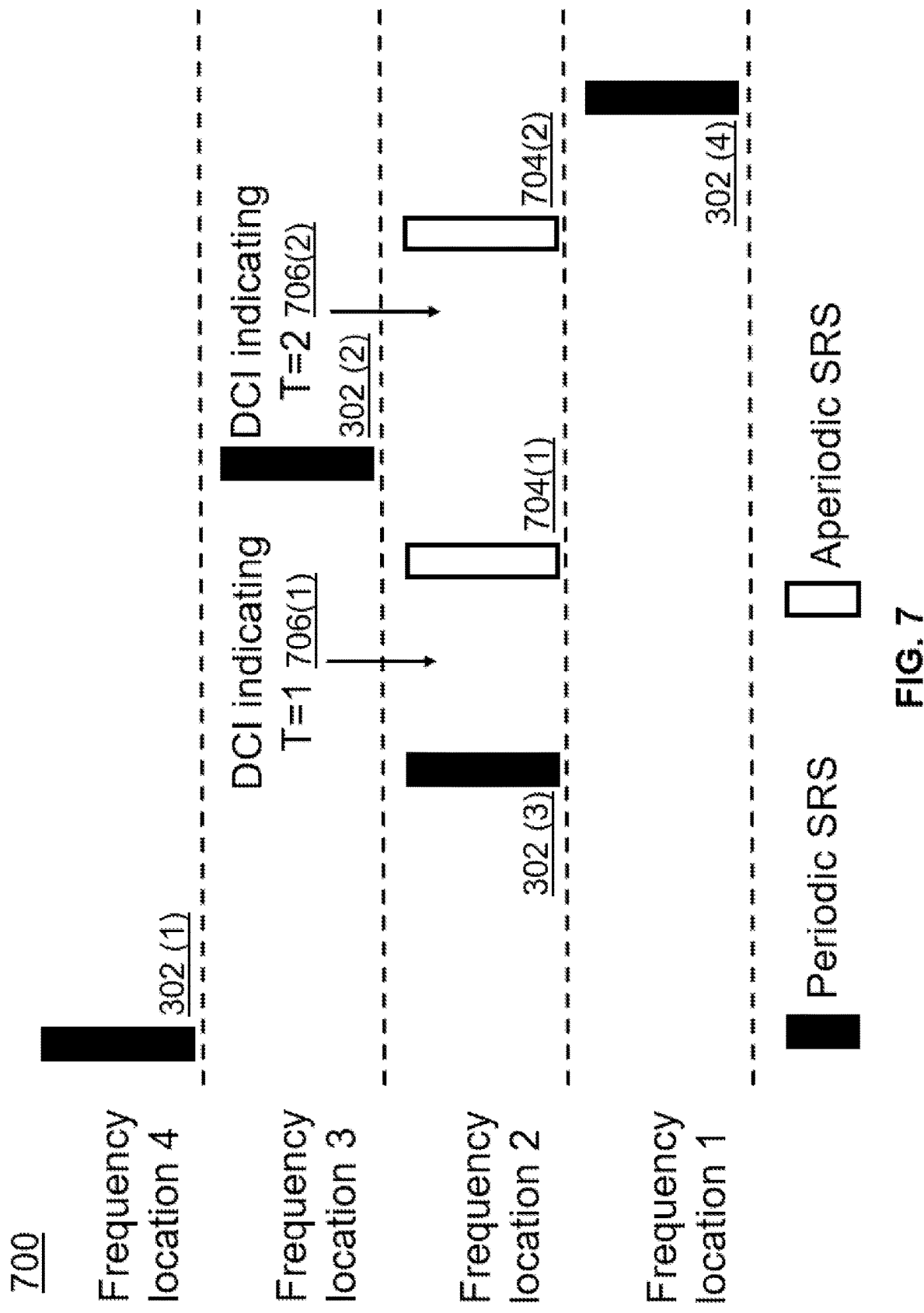

Referring now to FIG. 7 depicted is a representation 700 of an example approach for improving SRS measurement performance that increases the flexibility of the wireless communication node. The wireless communication node may configure and/or determine a parameter T in the configuration of the bundled SRS resources, the SRS resource set, and/or the SRS trigger state. The parameter T may specify and/or indicate a number of non-aperiodic SRS occasions 304. A DCI 706 (or other message) may indicate and/or specify the SRS trigger state with the aperiodic SRS resource set 704 and/or the value of T. The frequency location of the T-th non-aperiodic SRS occasion prior to the DCI 706 may indicate and/or specify the frequency location of the bundled aperiodic SRS resource. For example, the frequency location of the aperiodic SRS 704 may include or correspond to the frequency location of the T-th non-aperiodic SRS occasion prior to the DCI 706 transmission. In another example, the frequency location of the aperiodic SRS 704(1) may include or correspond to the frequency location of the first non-aperiodic SRS 302(3) prior to the DCI 706(1) transmission. In yet another example, the frequency location of the aperiodic SRS 704(2) may include or correspond to the frequency location of the second non-aperiodic SRS 302(3) prior to the DCI 706(2) transmission.

The configuration of the T-th non-aperiodic SRS 302 prior to the DCI 706 transmission may indicate and/or specify the configuration of the aperiodic SRS 704. For example, the configuration of the aperiodic SRS 704(1) may be the same as the configuration of the first non-aperiodic SRS 302(3) prior to the DCI 706(1) transmission. The hopping pattern of the T-th non-aperiodic SRS 302 prior to the DCI 706 transmission may indicate and/or specify the hopping pattern of the aperiodic SRS 704. For example, the hopping pattern of the aperiodic SRS 704(2) may be the same as the hopping pattern of the second non-aperiodic SRS 302(2) prior to the DCI 706(2) transmission.

In some embodiments, the associated non-aperiodic SRS occasion may indicate and/or refer to the T-th non-aperiodic SRS occasion 302 before the DCI 706 transmission. The DCI 706 transmission (or other transmissions) may trigger and/or cause the transmission of the aperiodic SRS 704. In some embodiments, the number of RBs used for the transmission of the associated non-aperiodic SRS occasion 302 may indicate and/or specify the number of RBs used for the transmission of the aperiodic SRS 704. For example, the number of RBs used for the transmission of the aperiodic SRS 704 may be the same as the number of RBs used for the transmission of the associated non-aperiodic SRS occasion 302. The hopping pattern/profile of the transmission of the associated non-aperiodic SRS occasion 302 may indicate and/or specify the hopping pattern/profile of the aperiodic SRS 704. For example the hopping pattern/profile of the aperiodic SRS 704 may be the same as the hopping pattern/profile used for the transmission of the associated non-aperiodic SRS occasion 302.

In some embodiments, the wireless communication device may transmit the associated non-aperiodic SRS occasion 302 using frequency hopping. However, the wireless communication device may transmit the aperiodic SRS 704 without using frequency hopping. In some embodiments, the number of RBs used for the transmission of one hop of the associated non-aperiodic SRS occasion 302 may indicate and/or specify the number of RBs used for the transmission of the aperiodic SRS 704. For example, the number of RBs used for the transmission of the aperiodic SRS 704 may be the same as the number of RBs used for the transmission of one hop of the associated non-aperiodic SRS occasion 302. The frequency location of one hop of the associated non-aperiodic SRS occasion 302 may indicate and/or specify the frequency location of the aperiodic SRS 704(e.g., the frequency locations may be equal). The wireless communication node may determine and/or configure a hop index as discussed herein. The configuration of the non-aperiodic SRS occasion 302 may indicate, specify, and/or determine the number of RBs, the hopping pattern, the use of frequency hopping, the frequency location and/or other parameters of the aperiodic SRS 704 transmission. For example, the configuration of RBs used for the transmission of the non-aperiodic SRS occasion 302 may indicate one or more of the aforementioned parameters of the aperiodic SRS 704 transmission.

In some embodiments, one or more configuration parameters may determine, indicate, and/or specify the value of T. For example, the periodicity of the non-aperiodic SRS 302 and/or the duplex configuration (e.g., slot frame configuration) may indicate and/or determine the value of T. One or more fields of the DCI 706 may specify and/or determine the value of T. The one or more fields of the DCI 706 may comprise SRS request, time domain resource allocation (TDRA), frequency domain resource allocation (FDRA), SRI, transmitted precoding matrix indication (TPMI), modulation and coding scheme (MCS), Antenna ports, hybrid automatic repeat request (HARQ) process number indicators, and/or other fields.

If the value of T is determined, the frequency location of the non-aperiodic SRS (e.g., from the first occasion prior to the DCI 706 transmission to the T-th occasion prior to the DCI 706 transmission) may specify, indicate, and/or determine the frequency location of the aperiodic SRS 704. For example, the frequency location of the aperiodic SRS 704 may include or correspond to the union set of the frequency location of the first occasion of the non-aperiodic SRS 302 prior to the DCI 706 transmission to the T-th occasion of the non-aperiodic SRS 302 prior to the DCI 706 transmission. The number of RBs of the aperiodic SRS 704 may comprise the sum of the number of RBs of the non-aperiodic SRS 302, from the first occasion to the T-th occasion prior to the DCI 706 transmission.

The frequency location of the T-th occasion of the non-aperiodic SRS 302 prior to the aperiodic SRS 704 transmission may determine and/or specify the frequency location of the aperiodic SRS 704. In some embodiments, the frequency locations of the non-aperiodic SRS 302(e.g., from the first occasion prior to the transmission of the aperiodic SRS 704 to the T-th occasion prior to the transmission of the aperiodic SRS 704) may determine and/or indicate the frequency location of the aperiodic SRS 704. For example, the frequency location of the aperiodic SRS 704 may include or correspond to the union set of the frequency location of the first occasion of the non-aperiodic SRS 302 prior to the transmission of the aperiodic SRS 704 to the T-th occasion of the non-aperiodic SRS 302 prior to the transmission of the aperiodic SRS 704.

D. Collision Handling Between Non-Aperiodic and Aperiodic SRS

The non-aperiodic SRS may provide information to acquire the basic DL/UL channel state information (CSI). The bundled aperiodic SRS resource may enhance/improve/optimize the SRS measurement performance. Therefore, the non-aperiodic SRS may hold higher priority than the bundled aperiodic SRS resource. The bundled aperiodic SRS resource may refer to the aperiodic SRS which is configured to be associated with at least one non-aperiodic SRS.

The transmission of an aperiodic SRS resource bundled with a non-aperiodic SRS may overlap, collide, and/or conflict (e.g., in time domain) with the transmission of a non-aperiodic SRS in the time domain. If an overlap, collision, and/or conflict occurs, the wireless communication device may send/transmit the non-aperiodic SRS and/or may omit/skip/bypass the aperiodic SRS transmission. In some embodiments, if an overlap, collision, and/or conflict occurs, the wireless communication device may omit/skip/bypass the transmission of one or more overlapping symbols of the bundled aperiodic SRS resource. Instead, the wireless communication device may transmit the non-aperiodic SRS and/or one or more non-overlapping symbols of the bundled aperiodic SRS resource.

The rules for collision handling may extend to other UL signals and/or channels. For example, an aperiodic SRS resource bundled with a non-aperiodic SRS may overlap, collide, and/or conflict with one or more UL channels/signals in the time domain. If said overlap occurs, the wireless communication device may transmit the one or more UL channels/signals and/or omit/skip/bypass the transmission of the aperiodic SRS. The UL channels/signals may comprise at least one of PUSCH, PUCCH, periodic/semi-persistent SRS, PRACH, non-aperiodic SRS, aperiodic SRS (e.g., unassociated to a non-aperiodic SRS), and/or other channels/signals.

In some embodiments, if an overlap, collision, and/or conflict occurs, the wireless communication device may omit/skip/bypass the transmission of one or more overlapping symbols of the bundled aperiodic SRS resource. Instead, the wireless communication device may transmit the UL signals/channels and/or one or more non-overlapping symbols of the bundled aperiodic SRS resource.

E. Configuring Time Bundling Between Resources

Figure 8:
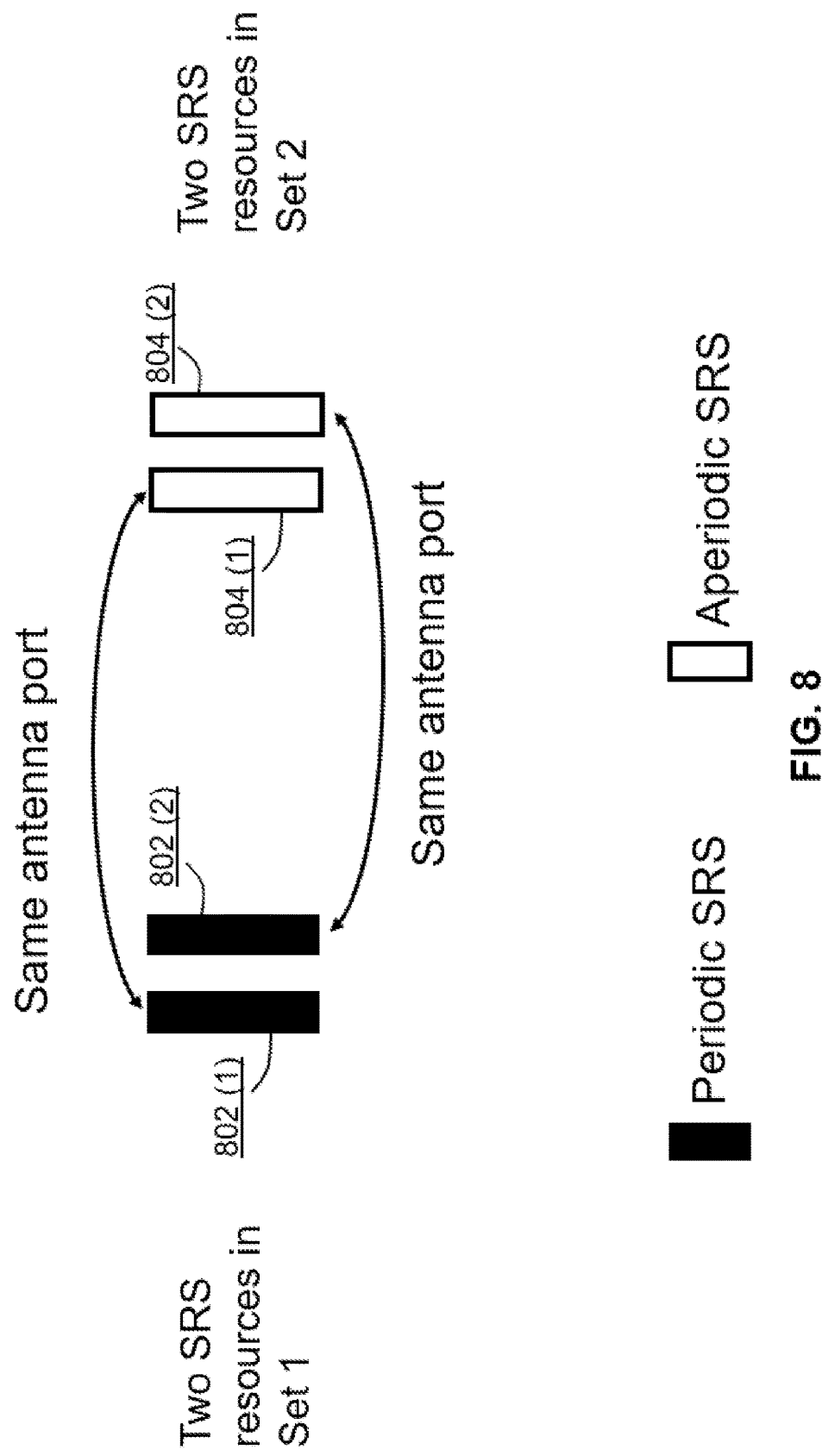
FIG. 8 illustrates example approaches for associating at least two resources in the time domain, in accordance with some embodiments of the present disclosure.

Referring now to FIG. 8, depicted is a representation 800 of an example approach for bundling, coupling, and/or associating at least two resources. At least two separate resources may be bundled, coupled, and/or associated in the time domain. The wireless communication node may configure, for example, resource identifiers (IDs) and/or the resource sequence to bundle/associate at least two separate resources. In some embodiments, the wireless communication node may configure the SRS bundling at the resource set level. The wireless communication node may configure at least two SRS resource sets that are bundled and/or associated. For example, the wireless communication node may configure the resource set comprising two non-aperiodic resources 802 and/or the resource set comprising two aperiodic resources 804. The wireless communication node may configure the two resource sets that are bundled and/or associated. In some embodiments, the wireless communication node may configure the SRS bundling at the resource level. The wireless communication node may configure at least two SRS resources that are bundled/associated. For example, the wireless communication node may configure the non-aperiodic resource 802(1) and/or the aperiodic SRS resource 804(1).

The wireless communication node (e.g., base station) and/or the wireless communication device (e.g., UE) may determine which resources are bundled/associated and/or utilize the same ports. The wireless communication node and/or the wireless communication device may determine the number of resources in at least two bundled SRS resource sets (e.g., the number of resources is the same). In some embodiments, the wireless communication node and/or the wireless communication device may determine that the SRS resources of separate resource sets are bundled with each other according to an order. The order may include the order of the SRS resource IDs, the order of the time domain locations of the SRS resources of the resource set, and/or other types of order/sequence.

In some embodiments, the antenna port(s) of the N-th resource of a first SRS resource set may include or correspond to the antenna port(s) of the N-th resource of a second SRS resource set. For example, the antenna port(s) of the second resource 802(2) of the first SRS resource set may be the same as the antenna port(s) of the second resource 804(2) of the second SRS resource set. The order (e.g., the order of the SRS resource IDs) may indicate and/or specify the parameter N of the N-th resource. The number of ports of the N-th resource of the first SRS resource set may include or correspond to the number of ports of the N-th resource of the second SRS resource set. For example, the number of ports of the first resource 802(1) of the first SRS resource set may be the same as the number of ports of the first resource 804(1) of the second SRS resource set.

F. Determining the Transmission Power of Bundled SRS Resources or Resource Sets The wireless communication node may utilize the transmission (Tx) power ratio of the bundled SRS resources to process and/or analyze the SRS resources in conjunction. The Tx power ratio may comprise the Tx power ratio between the non-aperiodic SRS and the aperiodic SRS. In some embodiments, the wireless communication device may send/transmit the Tx power ratio and/or the Tx power values to the wireless communication node. In some embodiments, the Tx power of a first bundled SRS resource may include or correspond to the Tx power of a second bundled SRS resource. For example, the Tx power of a first SRS resource and a second SRS resource may be the same. In some embodiments, the SRS resources (e.g., the non-aperiodic and/or aperiodic SRS resources) may be bundled and/or associated. The Tx power may be determined and/or calculated with the following equation:

$$P_{SRS,b,f,c}(i, q_S, l) = \min\left\{ \begin{array}{l} P_{CMAX,f,c}(i), \\ P_{O_{SRS,b,f,c}}(q_s) + 10\log_{10}(2^\mu \cdot M_{SRS,b,f,c}(i)) + \\ \alpha_{SRS,b,f,c}(q_s) \cdot PL_{b,f,c}(q_d) + h_{b,f,c}(i, l) \end{array} \right\}$$

The wireless communication device may determine and/or configure the open-loop components using information, parameters and/or measures obtained from the wireless communication node. The open-loop component(s) (e.g., the path loss (PL)) of the Tx power of the aperiodic SRS resource may include or correspond to the open-loop component(s) of the Tx power of the associated non-aperiodic SRS occasion. For example, the open-loop component(s) (e.g., PL) of the Tx power of the aperiodic SRS resource and the Tx power of the associated non-aperiodic SRS occasion may be configured to be the same. One or more parameters of the equation may be determined, calculated, and/or acquired using information provided by the configuration of the SRS resources.

The wireless communication device may determine and/or configure the closed-loop component(s) (e.g., the TPC command, the term h in the equation, and/or other components) of the Tx power of the aperiodic SRS resource (or the resources of the aperiodic SRS resource set). The wireless communication device may determine and/or configure the closed-loop component(s) using information provided by the wireless communication node. For example, the wireless communication node may send/transmit the TPC command to the wireless communication device to help specify or define the closed-loop component(s). The wireless communication node may increase and/or improve the Tx power of the bundled aperiodic SRS resource if the Tx power measurement of the associated non-aperiodic SRS occasion is poor.

In some embodiments, a configuration parameter may determine, indicate and/or specify the open-loop component(s) (e.g., the PL) of the Tx power of the aperiodic SRS resource. The configuration parameter(s) of the Tx power of the aperiodic SRS resource may include or correspond to the configuration parameter(s) of the Tx power of the associated non-aperiodic SRS occasion. The wireless communication device may determine and/or configure the closed-loop component(s) (e.g., the TPC command, the term h in the equation, and/or other components) of the Tx power of the aperiodic SRS resource (or the resources of the aperiodic SRS resource set). The wireless communication device may determine and/or configure the closed-loop component(s) using information provided by the wireless communication node. In some embodiments, a power offset (indicated by the TPC command) of the bundled aperiodic SRS resource may be excluded in the accumulation of the TPC command (e.g., with regards to time expiration).

G. Methods of Sound Reference Signal (SRS) Time Bundling

Figure 9:
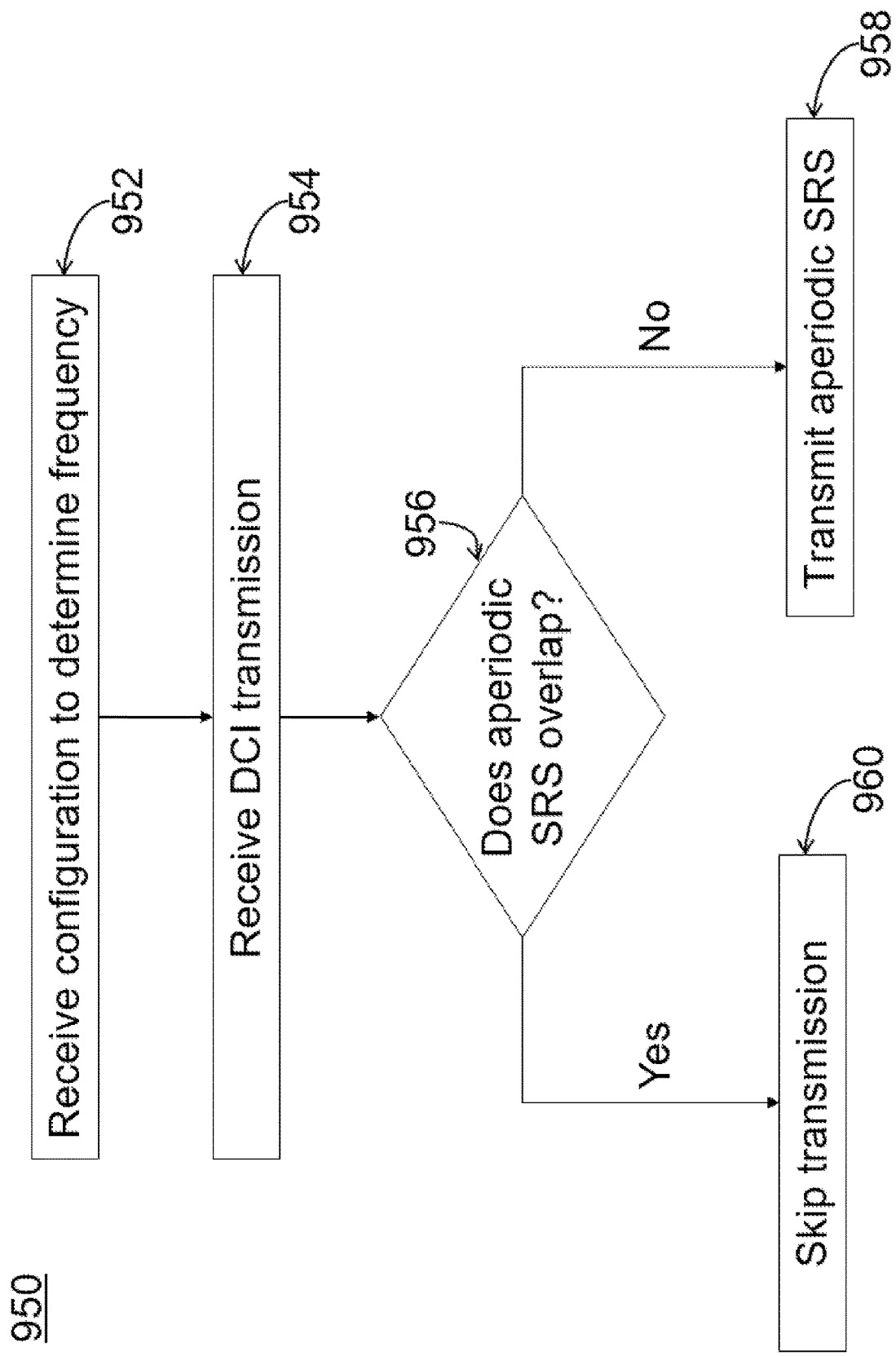
FIG. 9 illustrates a flow diagram of an example method of sound reference signal time bundling, in accordance with an embodiment of the present disclosure.

FIG. 9 illustrates a flow diagram of a method 950 of sound reference signal (SRS) time bundling. The method 950 may be implemented using any of the components and devices detailed herein in conjunction with FIGS. 1-8. In overview, the method 950 may include receiving configuration to determine a frequency location (952). The method 950 may include receiving a DCI transmission (954). The method 950 may include determining whether an aperiodic SRS overlaps (956). The method 950 may include transmitting the aperiodic SRS (958). The method 950 may include skipping a transmission (960).

Referring now to operation (952), and in some embodiments, a wireless communication device (e.g., a terminal node or a UE) may receive and/or obtain a configuration from a wireless communication node (e.g., a base station or a gNB). The configuration may indicate and/or specify a number of RBs used/occupied by the SRS resources, a hopping pattern, a frequency location, a hop index, and/or other parameters. The wireless communication node may generate and/or send/transmit the configuration to associate and/or bundle at least two SRS resources. One or more parameters of the configuration may provide information to determine and/or establish other parameters of the SRS resources. The configuration may be included in a configuration of a SRS resource, a SRS resource set and/or a SRS trigger state.

In some embodiments, the configuration may be included in a configuration of a SRS resource set. For example, the configuration of the SRS resource set may indicate and/or provide information regarding two or more associated/bundled resources. The SRS resource set may comprise one or more SRS resources. The SRS resource set may be a resource set of aperiodic and/or non-aperiodic (e.g., periodic and/or semi-persistent) SRS. The SRS resource set may include one or more resources (e.g., non-aperiodic and/or aperiodic SRS resources). The number of resources in one or more resource sets may be the same. For example, the number of resources in a resource set of the aperiodic SRS and a number of resources in a resource set of the associated non-aperiodic SRS may be the same. The SRS resources in a resource set of the aperiodic SRS may each be associated/bundled with a respective SRS resource in a resource set of the non-aperiodic SRS. The SRS resources may be associated/bundled according to an order of resource identifiers. For example, the SRS resource included in the aperiodic SRS resource set with the first resource identifier may be associated/bundled with the SRS resource included in the non-aperiodic SRS resource set with the first resource identifier. The SRS resources may be associated/bundled according to an order of time domain locations, of the SRS resources in the resource set of the non-aperiodic SRS. The resource set may indicate and/or specify the antenna port(s) in a N-th resource in the resource set. The antenna port(s) in a N-th resource of the aperiodic SRS resource set may be the same as the antenna port(s) in a N-th resource of the non-aperiodic SRS resource set. For example, the antenna port(s) in the fourth resource of the aperiodic SRS resource set may be the same as the antenna port(s) in the fourth resource of the non-aperiodic SRS resource set. The N-th resource may be determined based on the order of the SRS resource identifiers or the order of time domain locations, of the SRS resources in each resource set.

The wireless communication node may send and/or transmit a configuration to the wireless communication device to determine a first frequency location of an aperiodic sounding reference signal (SRS). The frequency location(s) may comprise a subset of the full bandwidth occupied/used by the SRS resource, a range of frequencies, a frequency value, and/or other frequency locations. The frequency location(s) may include the frequency location of a SRS resource of the aperiodic and/or non-aperiodic SRS. The wireless communication device may determine the first frequency location according to a second frequency location of at least one occasion of a non-aperiodic SRS (e.g., a periodic or semi-persistent SRS). For example, the second frequency location may include or correspond to the first frequency location. In some embodiments, the wireless communication device may determine/establish that the first frequency location is the same as the second frequency location. For example, the wireless communication device may determine the frequency location of the aperiodic SRS to be the same as the frequency location of one or more occasions of the non-aperiodic SRS. The wireless communication device may determine and/or establish that the first frequency location is a subset of the second frequency location. The wireless communication device may determine/establish that a hopping pattern of the aperiodic SRS is the same as a hopping pattern of the at least one occasion of the non-aperiodic SRS. For example, the wireless communication device may determine that the first frequency location and/or the hopping pattern of the aperiodic SRS are the same as the frequency location and/or hopping pattern of the non-aperiodic SRS. The wireless communication device may determine that the first frequency location is the same as the frequency location of one or more frequency hops of the at least one occasion of the non-aperiodic SRS. For example, the wireless communication device may determine a subset of the second frequency location is the same as the frequency location of the one or more frequency hops. The wireless communication device may determine the one or more frequency hops according to at least one parameter of the configuration. For example, the wireless communication device may determine, establish, and/or identity one frequency hop according to at least one parameter of the configuration (e.g., the number of RBs, the hop index).

An occasion of the non-aperiodic SRS 302 may comprise one or more SRS 302 using the same frequency location(s) and time slot(s). In some embodiments, the at least one occasion of the non-aperiodic SRS may comprise a most recent occasion of the non-aperiodic SRS occurring before the DCI transmission and/or before the transmission of the aperiodic SRS. The at least one occasion of the non-aperiodic SRS may comprise a T-th occasion of the non-aperiodic SRS occurring before the DCI transmission and/or before the transmission of the aperiodic SRS. For example, the non-aperiodic SRS occasion may comprise the second occasion of the non-aperiodic SRS occurring prior to the DCI transmission. The at least one occasion of the non-aperiodic SRS may comprise a plurality of occasions from a T-th occasion to a first occasion of the non-aperiodic SRS occurring before the DCI transmission and/or before the transmission of the aperiodic SRS. For example, the non-aperiodic SRS occasion may comprise three occasions (e.g., from a third occasion to a first occasion) of the non-aperiodic SRS prior to the transmission of the aperiodic SRS.

The wireless communication device may determine a value of T according to at least one indication (e.g., via signaling) from the wireless communication node. For example, the at least one signaling may indicate and/or determine the value of T. The at least one indication may include a configuration parameter of the configuration. For example, the at least one signaling may include a configuration parameter specified in the configuration of the SRS resource, the SRS resource set, and/or the SRS trigger state. In some embodiments, the at least one indication may correspond to at least one indication in at least one field (e.g., SRS request, TDRA, FDRA, SRI, TPMI, MCA, antenna ports, HARQ process number indicator, and/or other fields) of the DCI transmission. For example the at least one signaling may correspond to the SRS request, TDRA, and/or FDRA fields of the DCI.

Referring now to operation (954), and in some embodiments, the wireless communication device may receive and/or obtain a downlink control information (DCI) transmission. The wireless communication node may send the DCI transmission to trigger, initiate and/or prompt the wireless communication device to transmit the aperiodic SRS using the first frequency location (or other frequency location). The wireless communication node may configure, generate, send and/or transmit the DCI (or other information) transmission responsive to an instantaneous/dynamic interference and/or channel variation. The wireless communication device may send and/or transmit the aperiodic SRS responsive to receiving the DCI transmission (or other transmissions). The wireless communication device may use the first frequency location (or other frequency locations) to transmit the aperiodic SRS. For example, the wireless communication device may send/transmit the aperiodic SRS using the frequency location of the non-aperiodic SRS occasion responsive to receiving the DCI transmission.

Referring now to operation (956), and in some embodiments, the wireless communication device may determine the aperiodic SRS is to overlap with another uplink transmission in the time domain. The uplink transmission may comprise a physical uplink shared channel (PUSCH), a physical uplink control channel (PUCCH), the non-aperiodic SRS, a physical random access channel (PRACH), another aperiodic SRS, and/or other transmissions. The wireless communication device may determine that the aperiodic SRS and uplink transmissions overlap by using and/or analyzing the time domain resources allocated to both transmissions. If the aperiodic SRS transmission overlaps/conflicts with another uplink transmission in the time domain, the transmission of the aperiodic transmission is cancelled/rescheduled/omitted/bypassed/skipped. Instead, the wireless communication device may transmit/send the uplink transmission. In some embodiments, the wireless communication device may transmit/send the non-overlapping symbols of the aperiodic SRS transmission and/or the uplink signal/channel.

Referring now to operation (958), and in some embodiments, the wireless communication device may transmit or be caused to transmit the aperiodic SRS. The wireless communication device may transmit the aperiodic SRS responsive to determining an absence of an overlap between the aperiodic SRS and the uplink transmission. For example, the wireless communication device may schedule a PUSCH transmission and/or receive/obtain a DCI transmission. The DCI transmission may trigger/cause the wireless communication device to transmit the aperiodic SRS. Responsive to receiving the DCI transmission, the wireless communication device may determine whether the aperiodic SRS and the PUSCH transmission (or other uplink transmission) overlap/conflict in the time domain. If the aperiodic SRS and the PUSCH transmission are non-overlapping, the wireless communication device may transmit the aperiodic SRS and the PUSCH transmission.

Referring now to operation (960), and in some embodiments, the wireless communication device may skip and/or omit the transmission of the aperiodic SRS and/or the one or more symbols of the aperiodic SRS. The wireless communication device may skip the transmission responsive to determining the aperiodic SRS and the uplink transmission overlap in the time domain. The wireless communication device may determine or be caused to determine that the one or more symbols of the aperiodic SRS would have overlapped with the uplink transmission. The wireless communication node may cause the wireless communication device to skip the transmission. For example, the wireless communication device may schedule a PUCCH transmission and/or receive/obtain a DCI transmission. The DCI transmission (from the wireless communication node) may trigger/cause the wireless communication device to transmit the aperiodic SRS. Responsive to receiving the DCI transmission, the wireless communication device may determine whether the aperiodic SRS and the PUCCH transmission (or other uplink transmission) overlap/conflict in the time domain. If the aperiodic SRS and the PUCCH transmission overlap, the wireless communication device may skip the transmission of the aperiodic SRS (or the overlapping symbols) and instead transmit the PUCCH transmission.

In some embodiments, a transmit power of the aperiodic SRS may be equal to a transmit power of the at least one occasion of the non-aperiodic SRS. The transmit power may comprise open-loop and/or closed-loop components. The open-loop component(s) of a transmit power of the aperiodic SRS may be equal to the open-loop component(s) of a transmit power of the at least one occasion of the non-aperiodic SRS. For example, the path loss (PL) of a Tx power of the aperiodic SRS may be equal to the PL of the Tx power of at least one occasion of the non-aperiodic SRS. In some embodiments, the aperiodic SRS and the non-aperiodic SRS may have a common set of parameters in the configuration. The common set of parameters may be used to determine the open-loop component(s) of a transmit power of the aperiodic SRS and/or a transmit power of the non-aperiodic SRS. The wireless communication device may determine the closed-loop component(s) (e.g., according to the TPC command) of the transmit power of the aperiodic SRS. The wireless communication device may determine the closed-loop component(s) of the aperiodic SRS according to a transmission power control (TPC) command and/or other indicators. The wireless communication device may send and/or transmit the TPC command to the wireless communication node. The TPC command may indicate and/or specify a power offset. The power offset may be excluded from an accumulation (e.g., towards expiration) of the TPC command.

While various embodiments of the present solution have been described above, it should be understood that they have been presented by way of example only, and not by way of limitation. Likewise, the various diagrams may depict an example architectural or configuration, which are provided to enable persons of ordinary skill in the art to understand example features and functions of the present solution. Such persons would understand, however, that the solution is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein. Thus, the breadth and scope of the present disclosure should not be limited by any of the above-described illustrative embodiments.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A person of ordinary skill in the art would further appreciate that any of the various illustrative logical blocks, modules, processors, means, circuits, methods and functions described in connection with the aspects disclosed herein can be implemented by electronic hardware (e.g., a digital implementation, an analog implementation, or a combination of the two), firmware, various forms of program or design code incorporating instructions (which can be referred to herein, for convenience, as "software" or a "software module), or any combination of these techniques. To clearly illustrate this interchangeability of hardware, firmware and software, various illustrative components, blocks, modules, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure.

Furthermore, a person of ordinary skill in the art would understand that various illustrative logical blocks, modules, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, modules, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein.

If implemented in software, the functions can be stored as one or more instructions or code on a computer-readable medium. Thus, the steps of a method or algorithm disclosed herein can be implemented as software stored on a computer-readable medium. Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "module" as used herein, refers to software, firmware, hardware, and any combination of these elements for performing the associated functions described herein. Additionally, for purpose of discussion, the various modules are described as discrete modules; however, as would be apparent to one of ordinary skill in the art, two or more modules may be combined to form a single module that performs the associated functions according to embodiments of the present solution.

Additionally, memory or other storage, as well as communication components, may be employed in embodiments of the present solution. It will be appreciated that, for clarity purposes, the above description has described embodiments of the present solution with reference to different functional units and processors. However, it will be apparent that any suitable distribution of functionality between different functional units, processing logic elements or domains may be used without detracting from the present solution. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the embodiments described in this disclosure will be readily apparent to those skilled in the art, and the general principles defined herein can be applied to other embodiments without departing from the scope of this disclosure. Thus, the disclosure is not intended to be limited to the embodiments shown herein, but is to be accorded the widest scope consistent with the novel features and principles disclosed herein, as recited in the claims below.

What is claimed is:

1. A method, comprising:
   receiving, by a wireless communication device from a wireless communication node, a configuration to determine a first frequency location of an aperiodic sounding reference signal (SRS) according to a second frequency location of at least one occasion of a non-aperiodic SRS;
   determining, by the wireless communication device, one or more frequency hops of the at least one occasion of the non-aperiodic SRS according to at least one parameter of the configuration, wherein the first frequency location is same as the one or more frequency hops;
   receiving, by the wireless communication device, a downlink control information (DCI) transmission; and
   transmitting, by the wireless communication device responsive to the DCI transmission, the aperiodic SRS using the first frequency location that is same as the one or more frequency hops of the at least one occasion of the non-aperiodic SRS.

2. The method of claim 1, comprising determining, by the wireless communication device, that the first frequency location is same as the second frequency location.

3. The method of claim 2, comprising determining, by the wireless communication device, that a hopping pattern of the aperiodic SRS is same as a frequency hopping pattern of the at least one occasion of the non-aperiodic SRS.

4. The method of claim 1, comprising determining, by the wireless communication device, that the first frequency location is a subset of the second frequency location.

5. The method of claim 1, wherein the at least one occasion of the non-aperiodic SRS comprises at least one of:
   a most recent occasion of the non-aperiodic SRS occurring before the DCI transmission,
   a most recent occasion of the non-aperiodic SRS occurring before the transmission of the aperiodic SRS,
   a T-th occasion of the non-aperiodic SRS occurring before the DCI transmission,
   a T-th occasion of the non-aperiodic SRS occurring before the transmission of the aperiodic SRS,
   a plurality of occasions from a T-th occasion to a first occasion of the non-aperiodic SRS occurring before the DCI transmission, or
   a plurality of occasions from a T-th occasion to a first occasion of the non-aperiodic SRS occurring before the transmission of the aperiodic SRS.

6. The method of claim 1, wherein the configuration is comprised in a configuration of a SRS resource, a SRS resource set, or a SRS trigger state.

7. The method of claim 5, comprising determining, by the wireless communication device, a value of T according to at least one indication from the wireless communication node.

8. The method of claim 7, wherein the at least one indication includes a configuration parameter of the configuration.

9. The method of claim 7, wherein the at least one indication corresponds to at least one indication in at least one field of the DCI transmission.

10. The method of claim 1, comprising:
    if the aperiodic SRS is to overlap with another uplink transmission in time domain, skipping the transmission of: (i) the aperiodic SRS, or (ii) one or more symbols of the aperiodic SRS that would have overlapped with the another uplink transmission, wherein the another uplink transmission comprises at least one of: a physical uplink shared channel (PUSCH), a physical uplink control channel (PUCCH), the non-aperiodic SRS, a physical random access channel (PRACH), or another aperiodic SRS.

11. The method of claim 1, wherein the configuration is comprised in a configuration of a SRS resource set, wherein:
    a number of resources in a resource set of the aperiodic SRS and a number of resources in a resource set of the non-aperiodic SRS are same;
    SRS resources in a resource set of the aperiodic SRS are each associated with a respective one of SRS resources in a resource set of the non-aperiodic SRS, according to an order of resource identifiers or an order of time domain locations, of the SRS resources in the resource set of the non-aperiodic SRS; or
    antenna ports in a N-th resource in the resource set of the aperiodic SRS are same as antenna ports in a N-th resource in the resource set of the non-aperiodic SRS.

12. The method of claim 1, wherein a transmit power of the aperiodic SRS is equal to a transmit power of the at least one occasion of the non-aperiodic SRS.

13. The method of claim 1, wherein an open-loop component of a transmit power of the aperiodic SRS is equal to an open-loop component of a transmit power of the at least one occasion of the non-aperiodic SRS.

14. The method of claim 1, wherein the aperiodic SRS and the non-aperiodic SRS have a common set of parameters in the configuration to determine an open-loop component of a transmit power of the aperiodic SRS and an open-loop component of a transmit power of the non-aperiodic SRS.

15. A wireless communication device comprising:
at least one processor configured to:
  receive, via a transceiver from a wireless communication node, a configuration to determine a first frequency location of an aperiodic sounding reference signal (SRS) according to a second frequency location of at least one occasion of a non-aperiodic SRS;
  determine, via the transceiver, one or more frequency hops of the at least one occasion of the non-aperiodic SRS according to at least one parameter of the configuration, wherein the first frequency location is same as the one or more frequency hops;
  receive, via the transceiver, a downlink control information (DCI) transmission; and
  transmit, via the transceiver responsive to the DCI transmission, the aperiodic SRS using the first frequency location that is same as the one or more frequency hops of the at least one occasion of the non-aperiodic SRS.

16. A method, comprising:
sending, by a wireless communication node to a wireless communication device, a configuration to determine a first frequency location of an aperiodic sounding reference signal (SRS) according to a second frequency location of at least one occasion of a non-aperiodic SRS,
  wherein one or more frequency hops of the at least one occasion of the non-aperiodic SRS is determined according to at least one parameter of the configuration, and wherein the first frequency location is same as the one or more frequency hops; and
sending, by the wireless communication node to the wireless communication device, a downlink control information (DCI) transmission to trigger the wireless communication device to transmit the aperiodic SRS using the first frequency location that is same as the one or more frequency hops of the at least one occasion of the non-aperiodic SRS.

17. A wireless communication node, comprising:
at least one processor configured to:
  send, via a transmitter to a wireless communication device, a configuration to determine a first frequency location of an aperiodic sounding reference signal (SRS) according to a second frequency location of at least one occasion of a non-aperiodic SRS,
    wherein one or more frequency hops of the at least one occasion of the non-aperiodic SRS is determined according to at least one parameter of the configuration, and wherein the first frequency location is same as the one or more frequency hops; and
  send, via the transmitter to the wireless communication device, a downlink control information (DCI) transmission to trigger the wireless communication device to transmit the aperiodic SRS using the first frequency location that is same as the one or more frequency hops of the at least one occasion of the non-aperiodic SRS.

* * * * *